United States Patent
Tsukagoshi

[19]

[11] Patent Number: 5,889,564
[45] Date of Patent: *Mar. 30, 1999

[54] SUBTITLE COLORWIPING AND POSITIONING METHOD AND APPARATUS

[75] Inventor: Ikuo Tsukagoshi, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 627,742

[22] Filed: Apr. 2, 1996

[30] Foreign Application Priority Data

Apr. 3, 1995 [JP] Japan ................................. 7-099436

[51] Int. Cl.$^6$ .................................................. H04N 9/74
[52] U.S. Cl. .......................... 348/594; 348/597; 348/473
[58] Field of Search ................................. 348/594, 563, 348/564, 582, 593, 598, 599, 473, 597; 345/113, 114; H04N 9/74

[56] References Cited

U.S. PATENT DOCUMENTS

| | | | |
|---|---|---|---|
| 4,420,770 | 12/1983 | Rahman | 358/183 |
| 4,800,423 | 1/1989 | Appiano et al. | 358/21 R |
| 5,489,947 | 2/1996 | Cooper | 348/589 |
| 5,537,151 | 7/1996 | Orr et al. | 348/564 |
| 5,568,167 | 10/1996 | Galbi et al. | 348/589 |
| 5,579,057 | 11/1996 | Banker et al. | 348/589 |
| 5,610,665 | 3/1997 | Berman | 348/564 |

*Primary Examiner*—Tommy P. Chin
*Assistant Examiner*—Nhon To Diep
*Attorney, Agent, or Firm*—Frommer Lawrence & Haug LLP; William S. Frommer

[57] ABSTRACT

Colorwiping and dynamic positioning of subtitles is achieved by encoding and decoding the subtitles separately from the video image. At the encoder, subtitles are generated for each respective video image. Colorwiping is performed by changing the color of the subtitles at a certain location in the video image. At the decoder, a buffer stores the subtitles along with subtitle decoding information. A controller precisely times a reading operation of the buffer to read out the subtitles during a real time display of the respective video image; and colorwiping is performed by changing the color of a portion of the subtitles at a location indicated by the subtitle decoding information. Dynamic positioning of the subtitles is achieved by delaying the time the controller executes the read operation. When the decoding technique is repeated for a number of frames, the viewer senses motion as the colorwiping and positioning gradually changes.

28 Claims, 18 Drawing Sheets

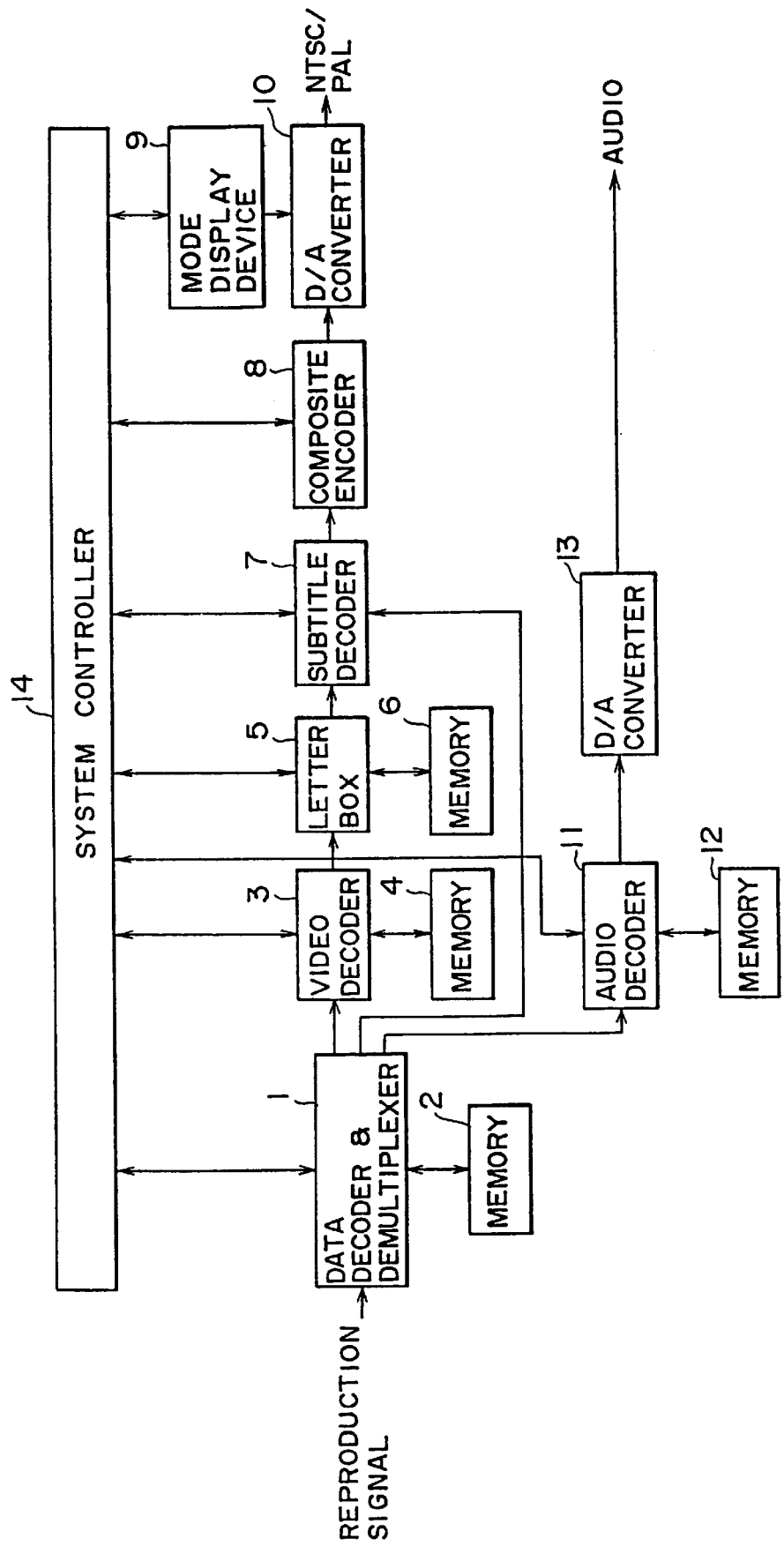

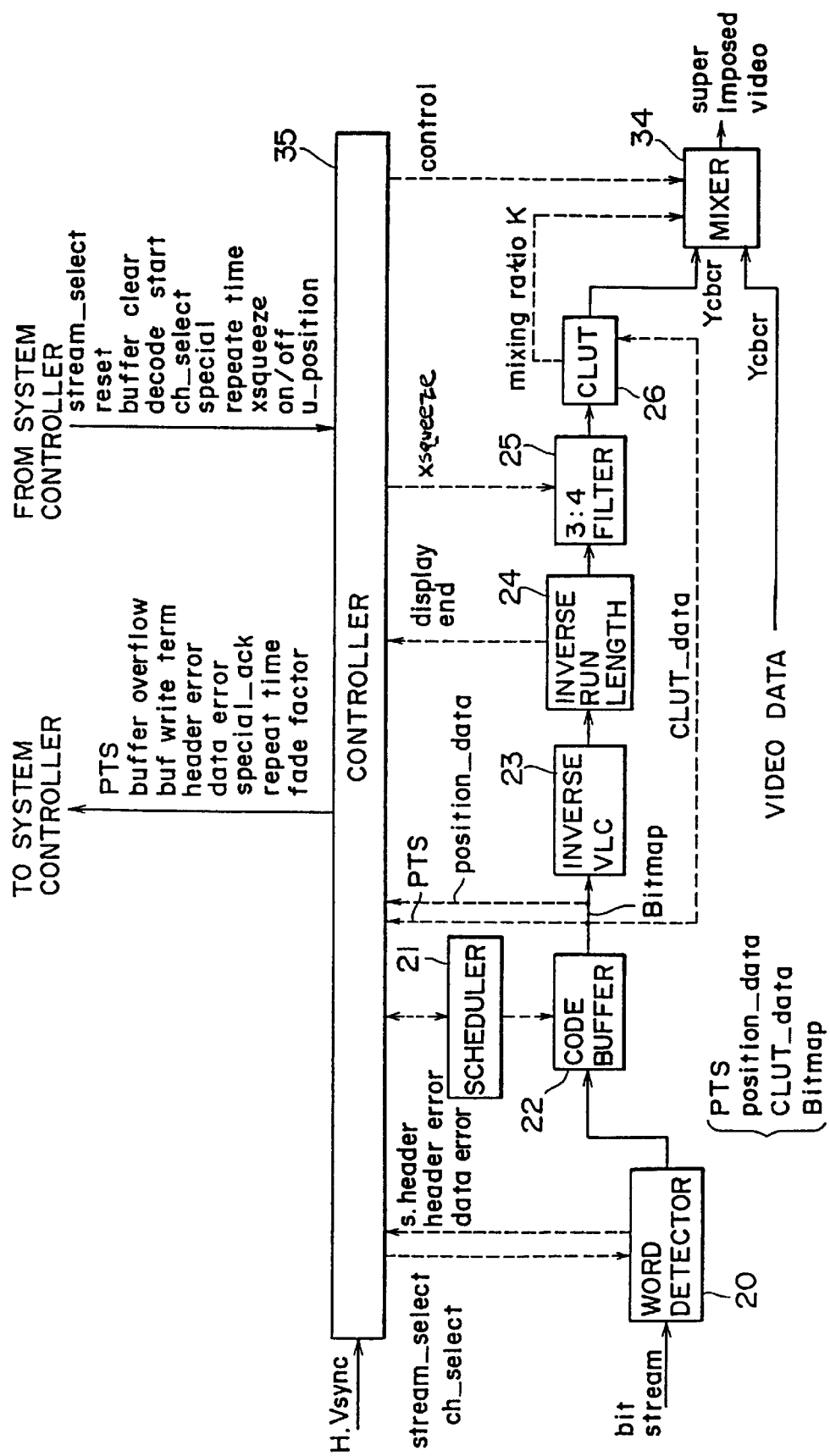

FIG. 3

(1) FROM SYSTEM CONTROLLER 14

| name | bits | description | rate |
|---|---|---|---|
| reset | 1 | SYSTEM RESET | |
| buffer clear | 1 | SYSTEM COMMAND OF DATA DISCARD DUE TO ERROR IN CODE DATA | |
| decode start | 1 | START OF DECODING (START TO READ CODE BUFFER) | max 30Hz |
| stream_select | 5 | STREAM DESIGNATION (NORMAL/SPECIAL PLAYBACK, ETC.) | max 30Hz |
| ch_select | 5 | DECODING CHANNEL DESIGNATION | static |
| special | 1 | SPECIAL PLAYBACK | as it happens |
| repeat time | 8 | DISPLAY TIME AT SPECIAL PLAYBACK | as it happens |
| xsqueeze | 1 | FOR 16:9 MONITOR SCREEN | static |
| on/off | 1 | SUBTITLE ON/OFF | static |
| u_position | 8 | USER-SPECIFIED DISPLAY POSITION (VERTICAL POSITION) | static |

(2) TO SYSTEM CONTROLLER 14

| name | bits | description | rate |
|---|---|---|---|
| PTS | 33 | TIME STAMP OF SUBTITLE DISPLAY TIME | max 30Hz |
| buffer overflow | 1 | 2 BANKS OF DATA IN BUFFER | max 30Hz |
| buf write term | 1 | END OF WRITING OF 1 BANK OF DATA | max 30Hz |
| header error | 1 | HEADER ERROR | max 30Hz |
| data error | 1 | DATA ERROR | max 30Hz |
| special_ack | 1 | ACK OF SPECIAL PLAYBACK | as it happens |
| repeat | 8 | DISPLAY TIME (NORMAL & SPECIAL) | max 30Hz |
| v.position | 8 | DISPLAY POSITION AT ENCODING | max 30Hz |
| fade factor | 4 | FADE-IN/OUT TIME | max 30Hz |

FIG. 4

```
----------------------------------------
(1) (2) : 8bit bus + 4bit select + 1bit I/O
others : real signal bits
----------------------------------------
```

(3) from generator          bits

H sync                  1

V sync                  1

13.5 Mbz clock        1

(4) from demux data stream          8 strobe                  1 error                   1

(5) to code buffer address              15 data                   8 xce                    1 xwe                    1 xoe                    1

(6) from video decoder video data (4:2:2)     16

(7) to DAC video data (4:2:2)     16

FIG. 5A
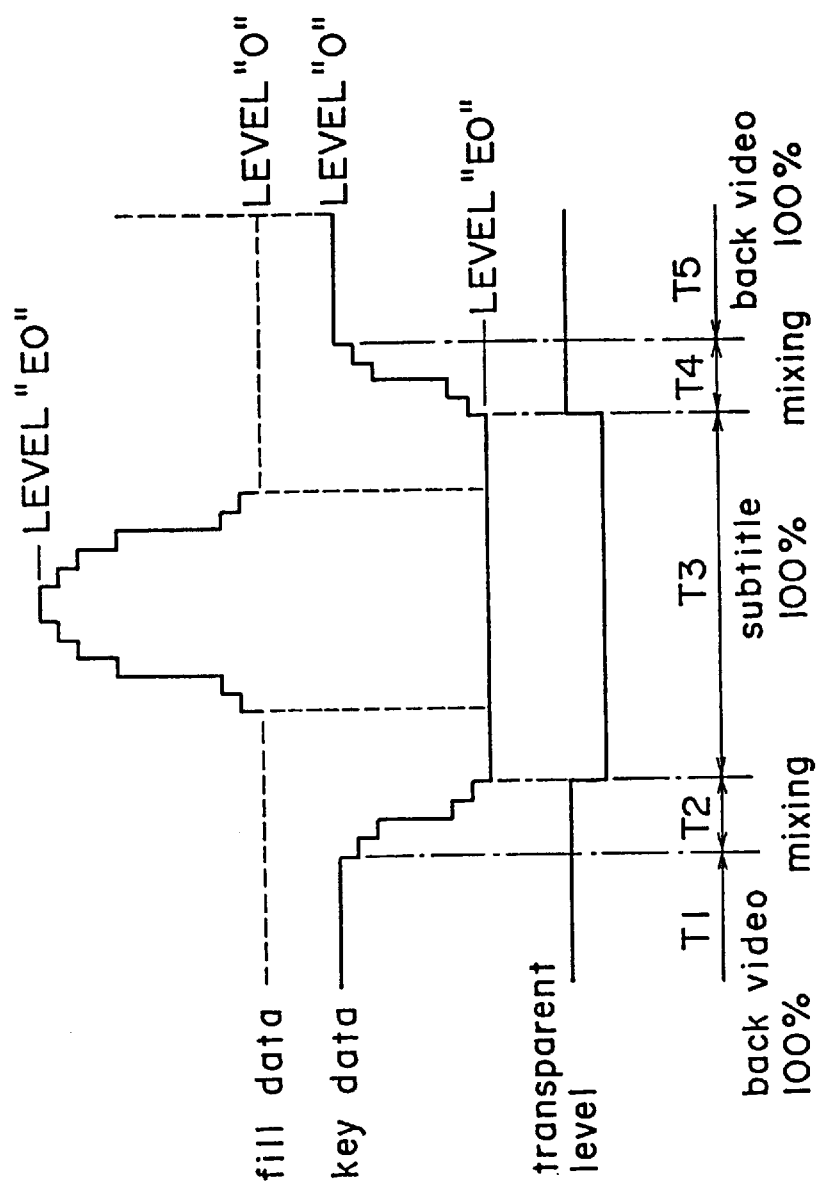
FIG. 5B
FIG. 5C

FIG. 6

| Addr | Y  | Cr | Cb | K   |
|------|----|----|----|-----|
| 0    | 00 | 7F | 7F | 00  |
| 1    | 00 | 7F | 7F | 20  |
| 2    | 00 | 7F | 7F | 40  |
| ⋮    |    |    |    |     |
| 6    | 00 | 7F | 7F | C0  |
| 7    | 00 | 7F | 7F | E0* |
| 8    | 00 | 7F | 7F | E0  |
| 9    | 20 | 7F | 7F | E0  |
| ⋮    |    |    |    |     |
| E    | C0 | 7F | 7F | E0  |
| F    | E0 | 7F | 7F | E0  |

\* E0 : 100 % SUBTITLE DATA
: 0 % VIDEO DATA

FIG. 7A
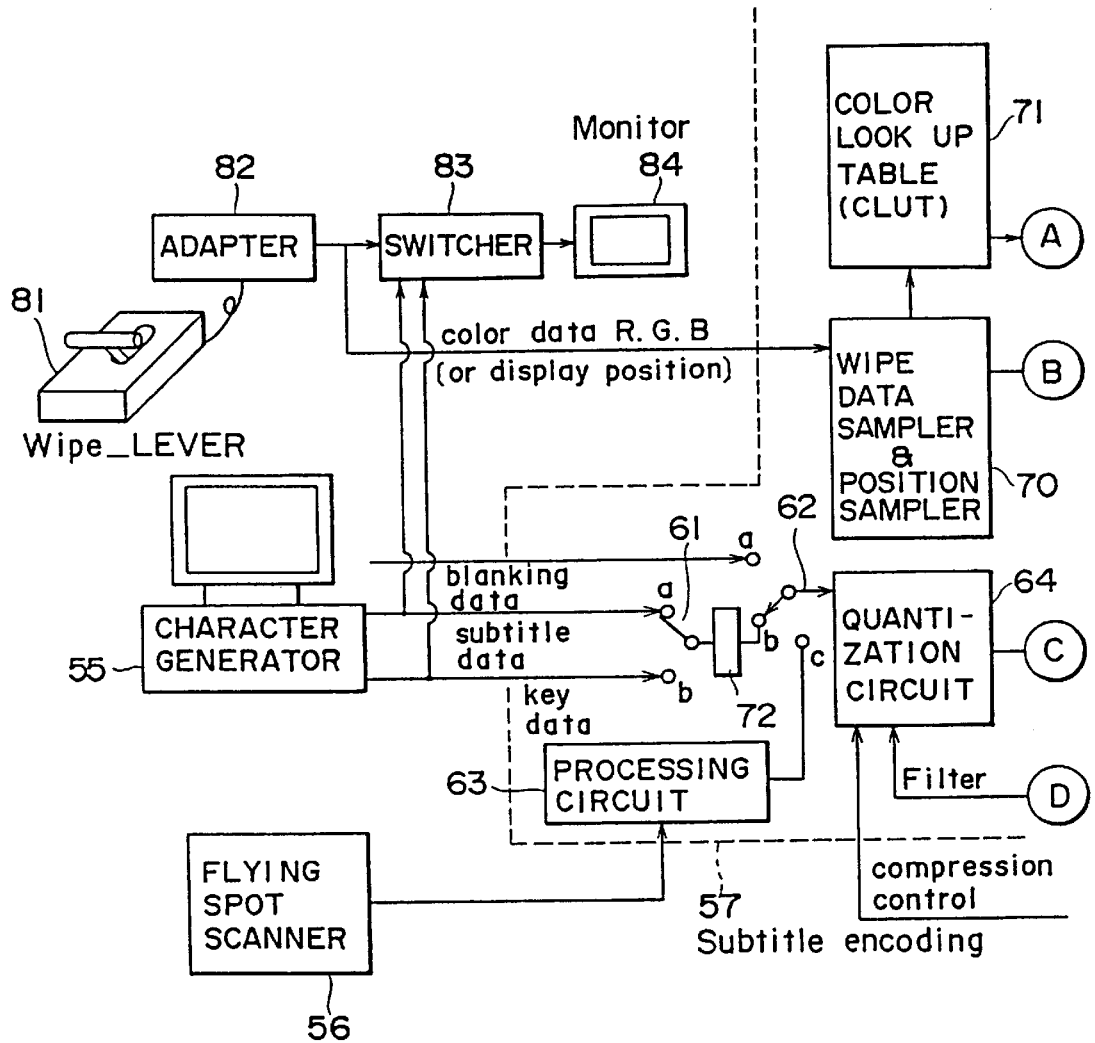
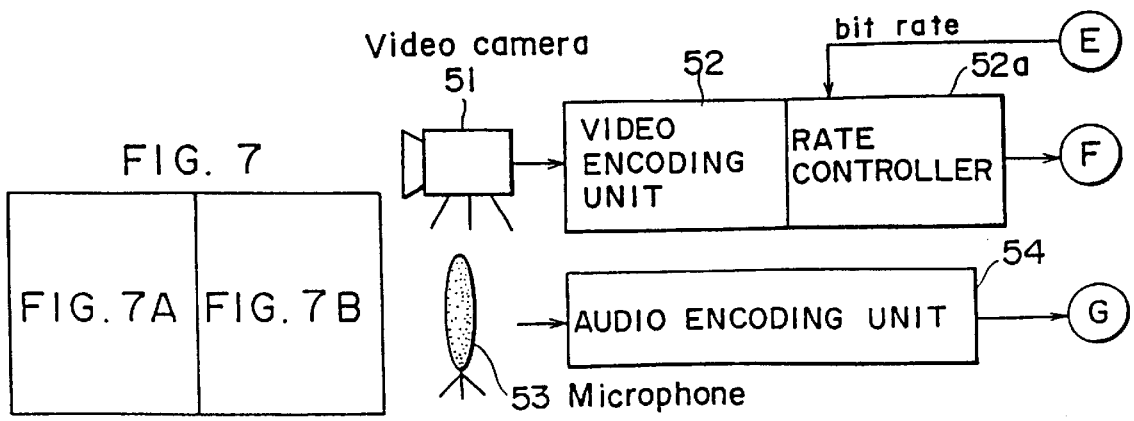

FIG. 9

Color Look Uptable

| Addr | Y  | Cr | Cb | K  |
|------|----|----|----|----|
| 0    | 00 | 7F | 7F | 00 |
| 1    | 20 | 7F | 7F | 40 |
| 2    | 40 | 7F | 7F | 80 |
| 3    | 60 | 7F | 7F | C0 |
| 4    | 80 | 7F | 7F | F0 |
| 5    | A0 | 7F | 7F | F0 |
| 6    | C0 | 7F | 7F | F0 |
| 7    | E0 | 7F | 7F | F0 |
| 8    | 00 | FF | FF | 00 |
| 9    | 20 | FF | FF | 40 |
| A    | 40 | FF | FF | 80 |
| B    | 60 | FF | FF | C0 |
| C    | 80 | FF | FF | F0 |
| D    | A0 | FF | FF | F0 |
| E    | C0 | FF | FF | F0 |
| F    | E0 | FF | FF | F0 |

Subtitle decoder buffer model

BLOCK DIAGRAM FOR CLUT SWITCHING

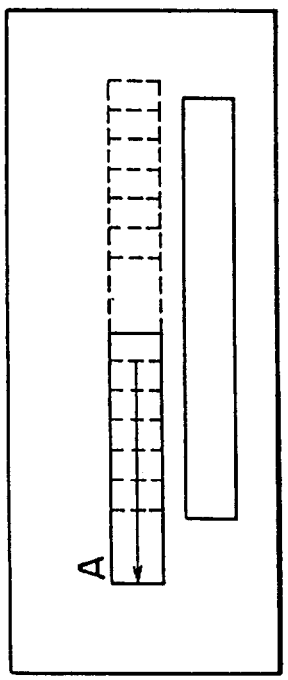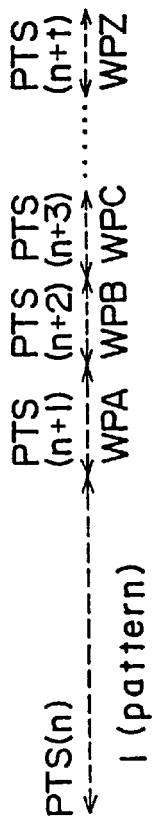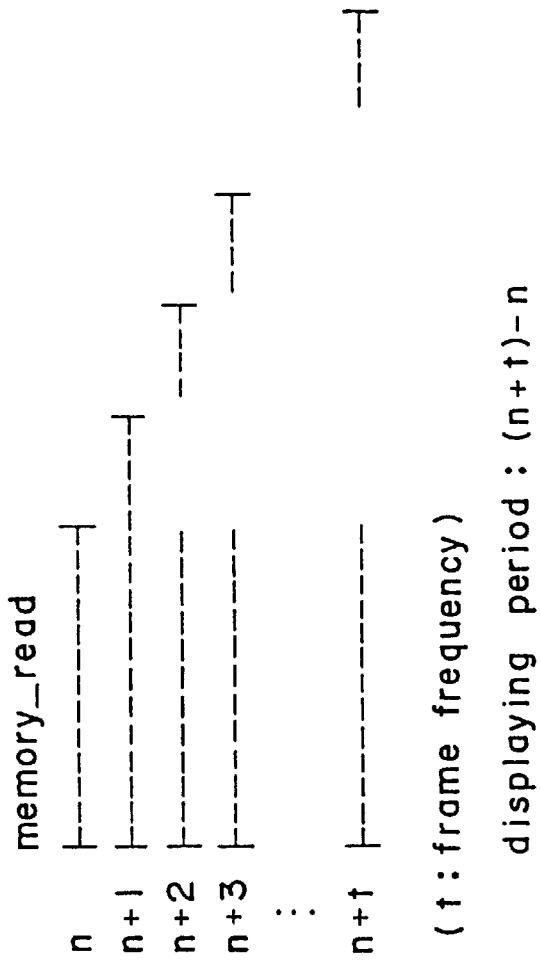
FIG.14A
FIG.14B
FIG.14C

BLOCK DIAGRAM FOR POSITION CONTROL

1 Block → 75Hz
1 Frame → 75 x 98Hz
subcode bit rate = 7.35kBytes/s

TRANSMISSION FORMAT

SUBTITLE COLORWIPING AND POSITIONING METHOD AND APPARATUS

BACKGROUND OF THE INVENTION

The present invention relates to subtitles and, more particularly, to colorwiping and positioning the subtitles.

Subtitles are superimposed on a video image to convey information to a viewer which supplements the video image. In Karaoke, for example, lyrics of songs are displayed on the video image as subtitles while a viewer sings along to an audio track of an accompanying video image. The subtitles also convey information to the viewer in the manner in which they are displayed. Highlighting the lyrics of songs in Karaoke, for example, cues the singer to sing, while moving the lyrics off the video screen indicates to the viewer to stop singing.

Television broadcasting or video reproduction (such as from a video disk) provides subtitles for display with the video image. However, the subtitles are permanently combined with the underlying video image and can be manipulated only at the transmitting (or recording) end and not at the receiving (or reproducing) end. That is, subtitles displayed in television broadcasting or video reproduction are "fixed" and cannot be highlighted or moved at the receiving (or reproduction) end. The subtitles also cannot be turned off, which is particularly important in Karaoke where a singer wants to test his/her singing abilities or enjoy the music video without the interruption of the subtitles.

The television broadcasting and reproduction systems cannot adequately manipulate the subtitles at the transmitting (or recording) end. The television broadcasting and reproduction systems require painstaking trial and error creation and manipulation of subtitles. In Karaoke, for example, where sing-along music videos are mass produced, it is desirable that each music video be produced quickly and efficiently. This is not possible with the television broadcasting and reproduction systems which require slow and tedious work to custom tailor each music video. Notably, dynamic positioning in a fixed-type television broadcast or recording is not possible because the subtitles are an integral part of video picture. Moving the subtitles, therefore, would leave a blank space where the subtitles were once superimposed.

Compact Disc Graphics (CD-G) provide more flexibility in displaying subtitles because this technique records graphics on a compact disc (CD) in the form of subcodes. However, CD-G has a serious disadvantage because this technique is limited to CD applications, which are slow by television standards. That is, the CD-G technique does not lend itself to creation and manipulation of subtitles in real-time television broadcasts or video reproductions.

CD-G is successful for computer applications because the graphics are programmed in advance and the large processing time required to create the graphics is largely unseen by the end user. As will be shown with reference to FIGS. 16a–16c and 17, however, the lead time required to generate a full CD-G screen is 10.24 seconds, which is grossly inadequate for normal television or video broadcasts.

FIG. 16a depicts the CD-G data format in which one frame includes 1 byte of a subcode and 32 bytes of audio channel data. Of the 32 bytes, 24 bytes are allocated for L and R audio channel data (each channel having 6 samples with 2 bytes per sample) and 8 bytes are allocated to an error correction code. The frames are grouped as a block of 98 frames (Frame 0, Frame 1, . . . , Frame 96 and Frame 97) as shown in FIG. 16*b*. Eight blocks P,Q,R,S,T,U,V and W are transmitted as shown in FIG. 16*c*. The subcodes for Frames 0 and 1 in each block are defined as sync patterns S0, S1, whereas the remaining 96 frames store various subcode data. Among a group of 8 blocks, the first 2 blocks P, Q are allocated to search data employed for searching through record tracks; and graphic data can be allocated to the subcodes in the remaining 6 blocks R,S,T,U,V and W.

Since each block of 98 frames is transmitted at a repeating frequency of 75 Hz, the data transmission rate for 1 block is (75×98 bytes) 7.35 kHz, resulting in a subcode bit rate of 7.35K bytes/s. The transmission format for transmitting the information present in blocks R,S,T,U,V and W is shown in FIG. 17. Each of the 96 frames (2,3, . . . 97) of the 6 blocks (R,S,T,U,V and W) is arranged as a packet including 6 channels (R to W) of 96 symbols per channel. The packet is further subdivided into 4 packs of 24 symbols each (symbol 0 to symbol 23), with each symbol representing a frame.

A CD-G character is made up of 6×12 pixels. Since each pack is 6×24, a 6×12 character is easily accommodated in each pack. The CD-G format allocates the six channels of (R,S,T,U,V and W) and the 12 symbols 8 to 19 to a character. The remainder of the symbols in each of the packs store information about the character.

Mode information is stored in the first 3 channels (R, S, T) of symbol 0 in each pack, and item information is stored in the last 3 channels (U, V, W) of symbol 0. A combination of the mode information and the item information defines the mode for the characters stored in the corresponding pack as follows:

TABLE 1

| Mode | Item |
| --- | --- |
| 000 | 000 mode |
| 001 | 000 graphics mode |
| 001 | 001 TV-graphics mode |
| 111 | 000 user's mode |

An instruction is stored in all of the channels of symbol 1. Corresponding mode, item, parity or additional information for the instruction is stored in all of the channels of symbols 2 to 7. Parity for all of the data in the channels of symbols 0 to 19 is stored in all of the channels of the last 4 symbols (symbols 20 to 23) of each pack.

As discussed, the data is transmitted at a repeating frequency of 75 Hz. Therefore, a packet which contains 4 packs is transmitted at a rate of 300 packs per second (75 Hz×4 packs). That is, with 1 character allocated to the range of 6×12 pixels, 300 characters can be transmitted in 1 second.

However, a CD-G screen requires more than 300 characters. A CD-G screen is defined as 288 horizontal picture elements×192 vertical picture elements and requires more than twice the 300 characters transmitted in 1 second. The total transmission time for a 288×192 screen is, therefore, 2.56 seconds as shown by the following equation:

$$(288/6) \times (192/12) \div 300 = 2.56 \text{ seconds}$$

This is extremely long to regenerate each screen when it is considered that screens are usually refreshed every 0.6 seconds. This problem is compounded when hexadecimal codes are used for the characters because each hexadecimal expression requires 4 bits to represent 1 pixel. As a result, 4 times the data described above is transmitted increasing the transmission rate to 10.24 seconds (4×2.56 seconds). Since each screen requires a sluggish 10.24 seconds for transmission, a continual transmission of screens means that a lag time of 10.24 seconds is experienced when transmitting screens using the CD-G technique.

Thus, the CD-G technique is not performed in real time and is unacceptably slow for use in a real time broadcast. In generating Karaoke music videos, for example, it would be nearly impossible to synchronize the subtitles with the precise moment the lyrics are to be sung because the subtitles would have to be generated 10.24 seconds in advance of the music video.

The CD-G system also suffers from defects in reproducing the subtitles. The CD-G system displays subtitles only upon normal reproduction and not during special reproduction such as a fast forward or fast reverse reproduction. CD-G pictures are also subject to sing phenomena (in which oblique portions of a character are ragged) or flickering because this system allocates only one bit of data for each picture element. The lag time of the CD-G picture also prevents switching the subtitle display on or off at a high speed.

In one type of system (known as the CAPTAIN system), dot patterns, as well as character codes, represent the subtitles. This system, however, does not appear to be any better than the CD-G system and suffers from some of the same disadvantages. In both systems, for example, the subtitles lack refinement because these systems do not provide sufficient resolution power in displaying the subtitles. The CAPTAIN system, for example, is developed for a 248 (horizontal picture elements) by 192 (vertical picture elements) display and not for high resolution video pictures of 720×480.

OBJECTS OF THE INVENTION

An object of the invention, therefore, is to provide a subtitle method and apparatus for colorwiping subtitles.

A further object of the invention is to provide a subtitle method and apparatus which colorwipes the subtitles at the command of an operator and in real time.

A further object of the invention is to provide a subtitle method and apparatus for dynamically positioning the subtitles.

An even further object of the invention is to provide a subtitle method and apparatus which dynamically positions the subtitles at the command of an operator and in real time.

SUMMARY OF THE INVENTION

In accordance with the above objectives, the present invention provides a colorwiping encoding apparatus and method. A subtitle generator generates subtitles which are to be superimposed on a video image. The subtitles are encoded separately from the video image using an encoder. A colorwiping unit colorwipes at least a portion of the subtitles leaving the remaining portion in a different color.

A colorwiping decoding method and apparatus decodes the subtitles and video image encoded by the colorwiping encoding. A video decoder decodes the video data encoded at the encoding end. A buffer stores the subtitles for the video image including decoding information. A controller times the precise moment when the subtitles are to be read out from the buffer during a real time display of said video image and a colorwiping unit causes the color of at least a portion of the subtitles to be a different color than the remaining portion.

A position decoding method and apparatus dynamically positions the subtitles in any region of the video image. A video decoder decodes video data of a video image to be displayed. A buffer stores the subtitles for the video image including decoding information. A controller times the precise moment when the subtitles are to be read out from the buffer during a real time display of said video image and a positioning unit dynamically changes the position where the subtitles are superimposed on the video image.

The present invention, thus, provides colorwiping and dynamic positioning of the subtitles. Since the subtitles are encoded and decoded separately from the video image, the subtitles may be manipulated with great control and in real time. Colorwiping is achieved quickly and efficiently, allowing an operator to mass produce subtitled video pictures custom tailored to satisfaction. Dynamic positioning of the subtitles is equally as quick and efficient. Applying the colorwiping and positioning over a period of frames, the end viewer is provided with the sensation of motion as the subtitles are gradually colorwiped or repositioned over a period of time. These and other advantages will be noted upon a review of the description of the preferred embodiments below with reference to the figures.

BRIEF DESCRIPTION OF THE DRAWINGS

A more complete appreciation of the present invention and many of its attendant advantages will be readily obtained by reference to the following detailed description considered in connection with the accompanying drawings, in which:

FIG. 1 is a block diagram of a data decoding apparatus of the present invention;

FIG. 2 is a block diagram of the subtitle decoder depicted in FIG. 1;

FIG. 3 is a table of communications between the system controller of FIG. 1 and the controller of FIG. 2;

FIG. 4 is a table of parameters for the communications between components of FIG. 1 and FIG. 2;

FIGS. 5a to 5c are signal diagrams demonstrating data encoding of the present invention;

FIG. 6 is a color look up table referred to when encoding subtitle data;

FIGS. 7a and 7b constitute a block diagram of the encoding apparatus of the present invention;

FIGS. 8a and 8b depict a block diagram for the wipe data sampler of FIG. 7a;

FIG. 9 is a color look up table referred to when conducting a color wipe operation;

FIGS. 14a to 14c depict a scheme for the dynamic positioning operation;

DETAILED DESCRIPTION OF THE PREFERRED EMBODIMENTS

Figure 7B:
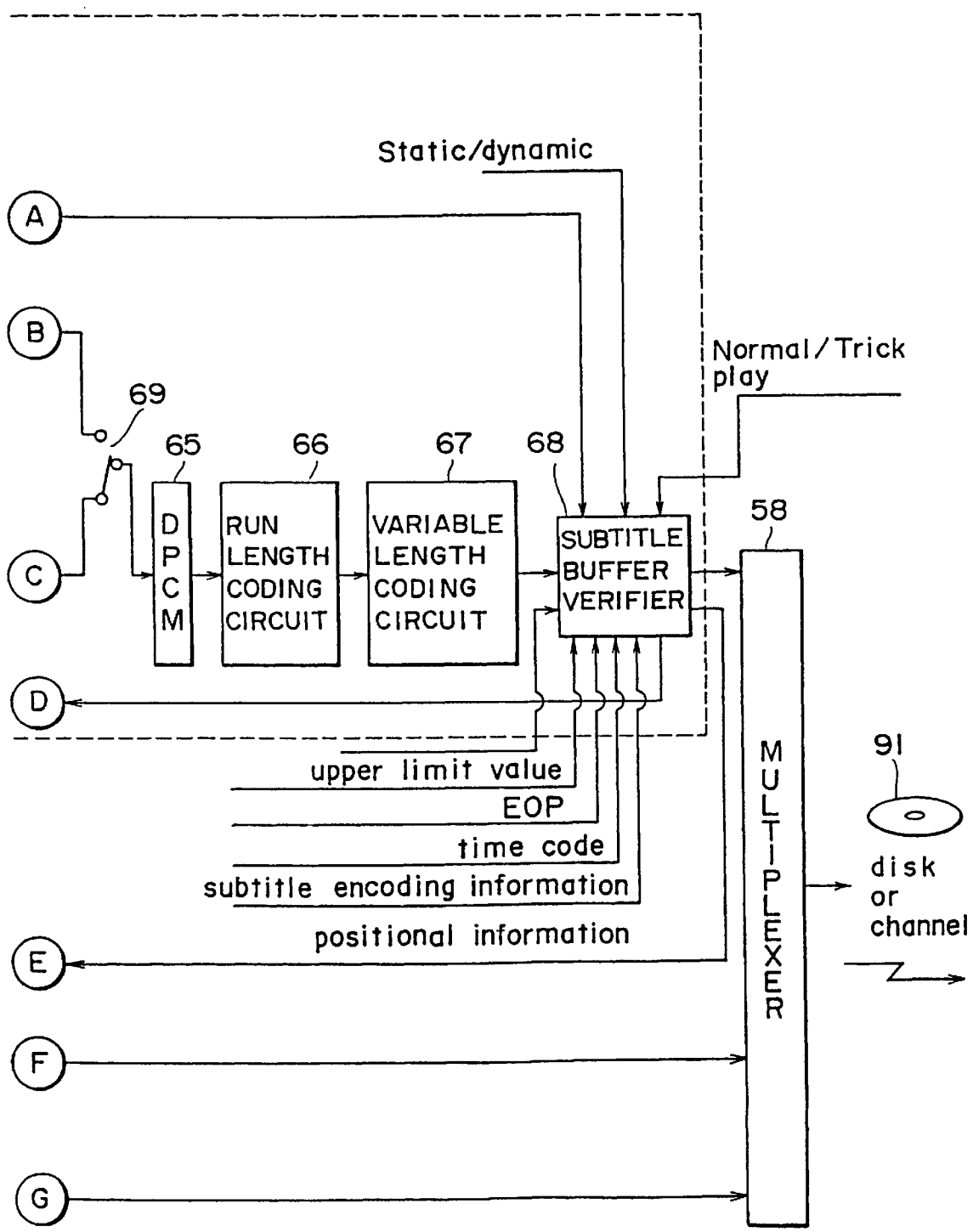

Referring now to the drawings, wherein like reference numerals designate identical or corresponding parts throughout, the present invention will be described.

Decoding Apparatus

The data decoding apparatus shown in FIG. 1 which incorporates the present invention decodes a reproduction signal. The system controller 14 of the data decoding apparatus causes the reproduction signal to be processed and sent to a subtitle decoder 7. The system controller communicates with the controller 35 (FIG. 2) of the subtitle decoder to decode the subtitles and superimpose them onto a decoded video image for display on a television screen.

A data decoder and demultiplexer 1 receives a digital reproduction signal from, for example, a VCR. The data decoder and demultiplexer 1 error decodes the reproduction signal preferably employing an Error Correcting Code (ECC) technique and demultiplexes the error decoded reproduction signal into video, subtitle and audio data. A memory 2 may be used, for example, as a buffer memory and a work area for the purpose of error decoding and demultiplexing the reproduction signal.

A video decoder 3 decodes the demultiplexed video data from a video data stream. A memory 4 may be employed for the operation of decoding the video data similar to the operation of the memory 2 employed with data decoder and demultiplexer 1.

A letter box circuit 5 converts a video picture with a 4:3 aspect ratio (a squeeze mode) to a 16:9 letter box ratio. The conversion is performed using a 4 to 3 decimation process, whereby every four horizontal lines are decimated to three horizontal lines, thus squeezing the video picture into a ¾ picture. According to the letter box format, a vertical resolution component is derived from the remaining ¼ of the video picture which is employed to enhance the vertical resolution of the decimated video picture. A timing control memory 6 ensures that the ¼ of the letter box picture is not transmitted. When the decoded video data generated by the video decoder 3 is already in a 16:9 letter box format, the letter box circuit bypasses the decimation operation and sends the decoded video data directly to the subtitle decoder 7.

Meanwhile, the decoded subtitle data demultiplexed by the data decoder and demultiplexer 1 is directly sent to the subtitle decoder 7. The subtitle decoder 7 decodes the subtitle data according to instructions from the system controller 14 and mixes the decoded subtitle data with the decoded video data.

A composite encoder 8 encodes the mixed subtitle data and video data into a suitable video picture format, such as NTSC/PAL. A mode display 9 interfaces with a user and indicates, for example, the mode of television monitor connected thereto. A D/A converter 10 converts the encoded signal received from the composite encoder 8 into an analog signal suitable for display in the indicated mode, such as NTSC or PAL.

The audio portion of the audio/video signal decoded by the data decoder and demultiplexer 1 is decoded by an audio decoder 11 which decodes the demultiplexed audio data using a memory 12, for example. The decoded audio data output from the audio decoder is converted into an analog audio signal appropriate for broadcast through a television monitor by a D/A converter 13.

Subtitle Decoder

The subtitle decoder 7, as will be discussed with reference to FIG. 2, decodes the encoded subtitle data and mixes the decoded subtitle data with the appropriate video data. A controller 35 controls the operations of the subtitle decoder and communicates with the system controller 14 of the decoder (FIG. 1) using the command signals shown in FIG. 2 (as listed in FIG. 3.) Together, the controller and system controller time the decoding of the subtitle data so that the subtitle data is mixed with video image data at the precise position the subtitles are to appear on the video image.

The word detector 20 of the subtitle decoder 7 receives the subtitle data in groups of bit streams. Each group of bit streams makes up one frame (or page) of subtitles to be superimposed on a video image. Different groups of streams may represent subtitles displayed in different playback modes, such as normal playback, fast-reverse or fast-forward. The system controller indicates to the word detector using a stream_select signal which playback mode to display and the word detector selects the appropriate stream of signals for the indicated playback mode. In the case where different video images are displayed on different channels, the system controller indicates the appropriate channel to the word detector correspondingly in a ch_select signal and the word detector changes channels to receive only those streams on the selected channel.

A group of bit streams making up one frame and received by the word detector include header information (s.header) which describes the format of the group of bit streams. The header information is accompanied with header error information (header error) and data error information (data error). The system controller uses the header to determine how to parse the group of bit streams and extract the relevant subtitle data. The system controller uses the header error information to correct anomalies in the header information and uses the data error information to correct anomalies in the subtitle data.

The word detector forwards the subtitle data (Bitmap) along with other decoding information (including a presentation time stamp PTS, position data position_data and color look up table data CLUT_data) to the code detector 22. The PTS is a signal that indicates the length of time the subtitles are to be displayed. The position data indicates the horizontal and vertical position where the subtitles are to be superimposed on the video image. The CLUT_data indicates which colors are to be used for the pixels making up the subtitles. For example, the system controller determines that a video image is being displayed and causes the code buffer to output the corresponding subtitle data (Bitmap) at a position in the video image represented by the horizontal and vertical position indicated by the position_data, in the color indicated by the CLUT_data and for a period of time indicated by the PTS.

A scheduler 21 is provided to ensure that the data received from the demultiplexer 1 (FIG. 1) does not overflow the code buffer 22. The scheduler controls read/write access to the code buffer by determining a bandwidth for an I/O port (not shown) which receives the bit streams selected by the word detector. The bandwidth refers to the number of parallel bits supplied to the I/O port at one time and is calculated by dividing the rate at which the demultiplexer demultiplexes data by the rate at which data is read from the code buffer. For example, a data rate from the demultiplexer of 20 Mbps divided by a 2.5 Mbps rate of data read from the code buffer is equal to 8 bits. Therefore, the scheduler will set the I/O port to receive 8 bits in parallel in order to maintain a consistent flow rate of data into and out of the code buffer. The code buffer, thus, receives the subtitle data (Bitmap) and awaits a decode start signal from the system controller to read out the data.

The system controller executes reading in real time when it is determined from the horizontal and vertical sync signals that the television scanner is at a position corresponding to the position indicated by the position_data. For real time display, the reading rate should correspond to a picture element sampling rate, preferably 13.5 MHz. As discussed, the subtitle data preferably is written into the code buffer at a rate of 2.5 MHz or more. Thus, the 13.5 MHz sampling clock is divided into four clock cycles of 3.375 MHz each. One of these 3.375 MHz clock cycles is allocated to writing (because writing requires at least 2.5 MHz) and the remaining three clock cycles are allocated to reading data from the code buffer, thus satisfying the requirement for real time display.

The read/write operation described is not only performed in real time, but also provides high resolution. Eight bits of the subtitle data are read from the code buffer 22 for each of three clock cycles, or twenty-four bits per sampling clock. When display of the picture is conducted by the television monitor every fourth clock cycle, one-fourth of the twenty-four bits, (24/4=) 6 bits are displayed at every clock cycle. That is, each subtitle picture element may comprise six bits, which is more than sufficient to achieve a high quality of resolution for the subtitles.

Figure 11:
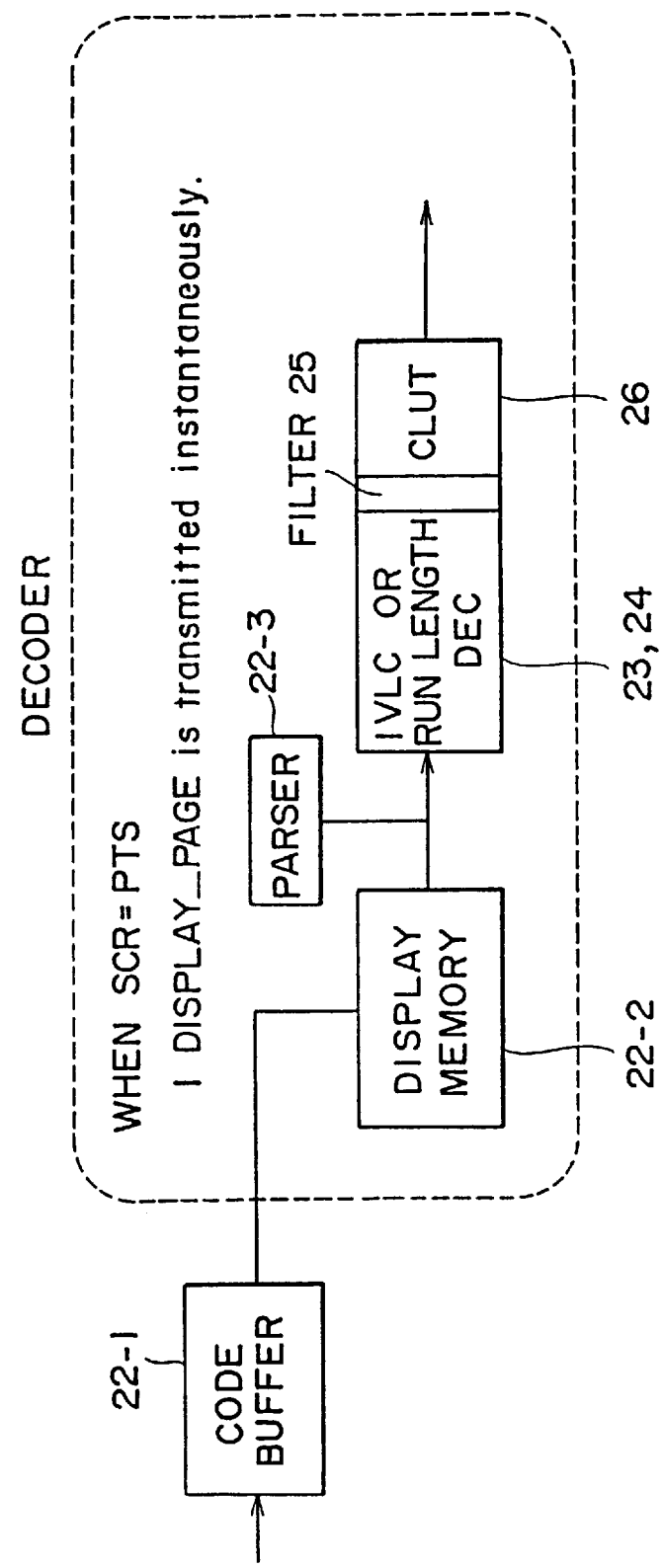
FIG. 11 is a block diagram describing the internal operation of the code buffer in FIG. 2.

The operation of the code buffer 22 and corresponding components of FIG. 2 is depicted as a block diagram in FIG. 11. The code buffer 22-1 accumulates streams of subtitle data until at least one page of subtitle data is accumulated in the code buffer. The subtitle data for one page is transferred from the code buffer 22-1 to the display memory 22-2 (which acts as a buffer for the subtitle decoder) when the display time stamp (PTS) is aligned with the synchronizing clock (SCR). The synchronizing clock advances a pointer in the display memory 22-2 during reading indicating which address of subtitle data is being currently read. It will be noted that placing the code buffer and display memory in a single unit is preferred since the code buffer need only increment one pointer pointing to the current address in the display memory 22-2 which stores the next set of subtitle data. Thus, no delay is caused due to a transfer, resulting in a high speed transfer of the subtitle data.

When the code buffer is read during a normal playback mode, the synchronizing clock advances the pointer of the display memory 22-2 at each pulse. However, during special reproduction (such as fast-forward, fast-reverse playback modes), the pointer must be advanced at a different rate. A special command is first sent to the controller 35 and the controller sends back an acknowledge signal (special_ack), acknowledging that special reproduction is to be initiated. To uniformly speed up (or slow down) the operations of the subtitle decoder according to the special reproduction rate, the system clock reference (SCR) can be altered by adding or subtracting clock pulses. Subtraction pulses are created at an n times rate corresponding to the rate of fast-feeding or fast-reverse feeding. For example, at the time when special reproduction is commenced, real time subtraction is performed on the bit stream of subtitle data read out from the code buffer at the n times rate and the pointer advances at the desired rate to effect the special playback mode.

When the special reproduction operation corresponds to a pause operation, on the other hand, no subtraction pulses are created. Instead, an identical frame is continuously read from the code buffer repeatedly, thus providing the sensation illusion that the subtitles are paused.

The reading operation is ended when the subtitle decoder 7 determines that an end of page (EOP) of the subtitle frame is reached. The system controller 14 sends a repeat time signal to the controller 35 which indicates the length of a page. An inverse run-length circuit 24 includes a counter and sends a display end signal to the controller 35 when the count value of the counter reaches the value indicated by the repeat time signal. When the controller 35 determines that the repeat time is reached, the reading operation of the code buffer is stopped. For purposes of this invention, the code buffer preferably stores at least two pages of subtitle data because one page will be read as another page is written into the code buffer.

The controller 35 issues a buffer overflow signal to the system controller 14 when an overflow of the code buffer occurs. An overflow can be determined when the controller receives the display end signal from the run-length circuit 24 before the word detector 20 receives an end of page (EOP) signal on the following page. At that time, the system controller 14 withholds transfer of subtitle data from the data decoder and demultiplexer 1 (FIG. 1) to the word detector to prevent an overflow of the code buffer. When an overflow condition has passed, the next stream will be written into the code buffer and displayed at the correct display start position.

An underflow condition exists when the code buffer has completed reading the subtitle data for an entire page and no further data exists in the code buffer. A code buffer with a capacity of two pages is depicted by the "code buffer size" line in FIG. 10. Graphically, an underflow would appear in FIG. 10 as one of the vertical portions of line (C) which extends below the lower limit of the code buffer. By contrast, an overflow condition is graphically depicted in FIG. 10 when the subtitle data read into the code buffer is too large, i.e., the horizontal portion of line (C) extends beyond line (B).

Figure 10:
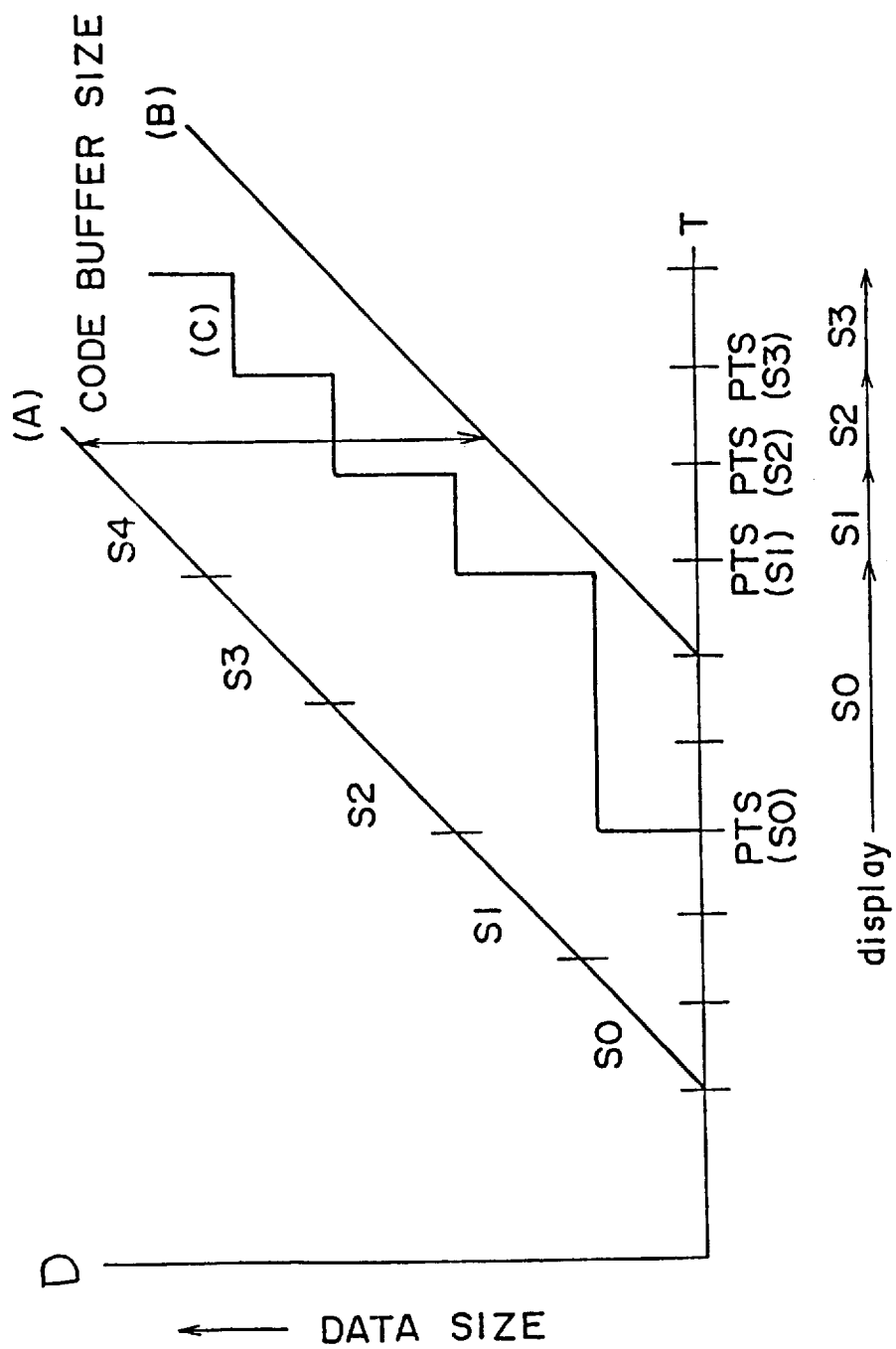
FIG. 10 is a graph for the explanation of a code buffer operation.

FIG. 10 graphically demonstrates the data flow into and out of the code buffer 22. The T-axis (abscissa) represents time, while the D-axis (ordinate) represents data size for each page of data. Thus, the gradient (rise/run) represents the data flow rate of the subtitles into the code buffer. Graph (C) represents the data flow of the subtitle data. The vertical portions of graph (C) indicate a transfer of subtitle data from the code buffer when the display time stamp (PTS) is aligned with the synchronizing clock (SCR) generated internally by the subtitle decoder 7. The horizontal portions of the graph (C) indicate the transfer of subtitle data into the code buffer. For example, at a time that the display time stamp (PTS) for page (S0) is received by the code buffer, the previous page of subtitle data is transferred from the code buffer and page (S0) is written into the code buffer. When another display time stamp (PTS) is received by the code buffer, the subtitle data of page (S0) is transferred out of the code buffer and page (S1) is written in. Similarly, the remaining pages (S2), (S3) are written into and read out of the code buffer as indicated.

To precisely time the reading of the subtitle data from the code buffer with the display of the video image, delay compensation must be performed to allow for delays within the subtitle decoder. This is especially important where an external memory is employed as the display memory because an external memory increases the delay factor. Delay compensation is achieved by controlling the timing of the decode start command from the system controller 14. The system controller 14 delays the decode start command by a time equal to the processing of a letter box picture (approximately one field) and a delay caused by video decoding at the instant the synchronizing clock of the controller (SCR) is aligned with the display time stamp (PTS). Delay compensation is particularly useful, since the video, audio and subtitle data are multiplexed on the premise that the decode delay in each of the video, audio and subtitle data signals is zero in the data encoding apparatus.

When the subtitle data for one page is read out of the display memory 22-2 (FIG. 11), the headers of the bit streams are separated therefrom by a parser 22-3 and forwarded to the inverse variable-length coder or run-length decoder 23, 24 during a vertical blanking period (V). The inverse VLC (Variable Length Coding) circuit 23 (FIG. 2) subjects the subtitle data to variable length decoding. The variable length decoded subtitle data is composed of level data ("1" or "0") and run data as paired data. In the case were variable length decoding is not employed, the inverse VLC circuit may be bypassed and the subtitle data read from the code buffer will be directly output to the inverse run-length circuit 24. The inverse run-length circuit 24 conducts run-length decoding by generating the level of data from the number of run data elements. Thus, the VLC circuit 23 and the run-length circuit 24 decompress the subtitle data which had been stored as compressed data in the code buffer 22.

The decompressed subtitle data is then sent to a 3:4 filter 25. The 3:4 filter receives an xsqueeze signal from the system controller 14 indicating the aspect ratio of the corresponding television monitor. Where the signal indicates that the monitor has a 4:3 aspect ratio, the 3:4 filter applies 3:4 filtration processing to the subtitle data to match the size of the subtitles to the size of the video picture. There are no FIG. 11. In the preferred embodiment, the controller 35 reads 90 pixels worth of subtitle data from the code buffer 22 before the H sync pulse is generated. In the case where the television monitor already has a 16:9 aspect ratio, or the decompressed subtitle data represents fonts, the 3:4 filter is bypassed as shown in FIG. 11.

A color look-up table 26 (CLUT) receives the subtitle data from the 3:4 filter 25 and the CLUT_data from the code buffer 22. The color look up table generates a suitable color from the CLUT_data for the subtitle data. The color look up table selects an address corresponding to the subtitle data for each pixel and forwards a mixing ratio K and color components Y (luminance), $C_R$ (color difference signal R-Y) and $C_B$ (color difference signal B-Y) to the mixer 34. The color components Y, $C_R$ and $C_B$, when mixed by the mixer, at the mixing ratio K create a pixel with the color indicated by the color look up table.

Background video data is incorporated in the arrangement of the color look-up table. For example, address 0 of the look-up table includes key data K having the value of 00h; which means that the subtitle data will not be seen and the background video data will manifest, as shown by regions T1 and T5 in FIG. 5c. Addresses 1h to 6h of the look-up table include values of the key data K which increase linearly (20, 40 . . . C0 hexadecimal); which means that the subtitle pixels according to these addresses are mixed with the background data as shown by the regions T2 and T4 in FIG. 5c. Finally, addresses 8h to Fh of the look-up table include values of key data K of the E0h; which means that the components Y, Cr and Cb are mixed without any background video data as shown by region T3 in FIG. 5c. The color look-up table data is generated from the system controller and is previously downloaded to the CLUT circuit before decoding. With the color look-up table, the filtered subtitle data is transformed into the appropriate color pixel for display on the television monitor.

FIG. 6 shows an example of a color look-up table where the components Y, Cr, Cb and K are arranged according to the addresses 0 . . . F (hexadecimal). As will be explained, color wiping is performed by changing the CLUT_data, thereby replacing part of the color look up table by the color wiping color look up table, shown in FIG. 9. Normally, a particular subtitle frame is refreshed several times because frames are refreshed on a television several times a second. When the subtitles are refreshed, the same subtitle data will be employed. However, the color will be different due to the changed color look up table. Thus, the subtitles will appear to be color wiped as they are refreshed with each consecutive frame.

A mixer 34 (FIG. 2) mixes the pixels from the color look-up table 26 with video data from the video decoder 3 (FIG. 1). The resulting mixed data represents a video picture with superimposed subtitles and is ready to be output to a television monitor. The mixer 34 is controlled to position the subtitles within the video picture. The system controller 14 sends a u_position signal generated by the commands of an operator to the mixer via controller 35 which designates the vertical position for display on the screen. The u_position value may be varied (either by a user, the transmitter, or otherwise) allowing a user to place the subtitles anywhere along a vertical axis.

The decoding apparatus of the present invention may be practiced with the parameters for the different signals shown in FIG. 4. However, the present invention is not limited to the parameters set forth in that figure and may be employed in different video systems.

With the present invention, a viewer has control over the display of the subtitle through the mode display device 9. The system controller 14, upon command from the user, sends a control signal to the mixer 34 (FIG. 2), turning the subtitles on or off. Since the present invention decodes subtitles in real time, the user does not experience any unpleasant delay when turning the subtitles on or off. In addition, the subtitles can be controlled, by the user or otherwise, to fade-in/fade out at a variable rate. This is achieved by multiplying a fade coefficient to the pattern data representing the subtitles at a designated speed. This function also allows an editor of the subtitles to present viewers with different sensations according to the broadcast of the audio/video picture. For example, news information may be "flashed" rapidly to draw the attention of the viewer, whereas subtitles in a slow music video "softly" appear in order not to detract from the enjoyment of the music video.

Encoding Technique

The encoding technique employed in the present invention will be described in more particular detail with reference to FIGS. 5a, 5b and 5c and FIG. 6. As an example, the technique for encoding the letter "A" of FIG. 5a will be explained. The letter "A" is scanned along successive horizontal lines and the fill data of FIG. 5b is generated for the letter "A" along each horizontal line. It will be noted that the level "E0" demarks the highest level for recreating a color pixel from the color look-up table shown in FIG. 6, whereas level "0" represents a lack of subtitle data.

The key data (K) (or mixing ratio) determines the degree to which the fill data is mixed with background video. Regions T1 and T5 of the key data correspond to areas in the video picture that are not superimposed with the fill data; therefore, these areas are designated as level 0 as indicated by address 0 in FIG. 6. Regions T2 and T4 are mixed areas where the subtitles are gradually mixed with the background video picture so that the subtitles blend into the background video picture and do not abruptly contrast therewith. Any of the fill data in this area is stored in addresses 1 through 6 of the color look up table. The main portion of the letter "A"

is displayed within the T3 region where the background information is muted. The subtitle information in region T3 is stored as addresses 7 to F (hexadecimal). The color look-up table of FIG. 6 is arranged in varying degrees of the luminance component Y. When a pixel in the region T3 is to be stored, for example, and the level of the luminance component Y for that particular pixel is 20 (hexadecimal), the color information for that pixel is obtained from address 9. In this manner, the remaining pixels for the subtitle characters are encoded.

Encoding Apparatus

The encoding apparatus of the present invention is depicted in FIGS. 7a, b. Audio and video information is received by a microphone 53 and video camera 51, respectively and forwarded to a multiplexer 58. The subtitle data are entered through either a character generator 55 or a flying spot scanner 56 and encoded by a subtitle encoding circuit 57. The encoded subtitle information is sent to the multiplexer 58 and combined with the audio/video information onto a record disc 91 or channel for transmission, display, recording or the like.

The video camera 51 generates the video signal and supplies the same to a video encoding unit 52 which converts the video signal from analog to digital form. The digitized video signal is then compressed for video transmission and forwarded to a rate controller 52a, which controls the rate that the compressed video data is transferred to the multiplexer in synchronism with the rate that the subtitles are sent to the multiplexer. In this manner, the compressed video data is combined with the subtitle data at the correct time. Similarly, audio information is obtained by the microphone 53 and encoded by an audio encoding unit 54 before being sent to the multiplexer. The audio encoding unit does not necessarily include a rate controller because the audio data may ultimately be recorded on a different track or transmitted over a different channel from the video data.

The subtitles are generated by either character generator 55 or flying spot scanner 56. The character generator includes a monitor and a keyboard which allows an operator to manually insert subtitles into a video picture. The operator edits the subtitles by typing the subtitles through the keyboard. The flying spot scanner 56, on the other hand, is provided in the situation where subtitles are already provided in an external video picture. The flying spot scanner scans the video picture and determines where the subtitles are positioned and generates corresponding subtitle data therefrom. The subtitles from the flying spot scanner are pre-processed by the processing circuit 63 to conform with subtitles generated by the character generator and forwarded to the subtitle encoding circuit.

The subtitle data from either the character generator 55 or the flying spot scanner are then selected for compression. The character generator outputs blanking data, subtitle data and key data. The subtitle data and key data are forwarded to a switch 61 which is switched according to a predetermined timing to select either the subtitle or key data. The selected data from switch 61 is filtered by a filter 72 and supplied to another switch 62. Switch 62 switches between the blanking data, the filtered data from the character generator and the processed data from the flying spot scanner. When it is determined that no subtitles are present, the blanking data is chosen by the switch 62. Where subtitles are present, the switch 62 chooses between the character generator data or the flying spot scanner data, depending upon which device is being used to generate the subtitle data.

The data selected by switch 62 is then quantized by a quantization circuit 64, using a quantization based on data fed back from a subtitle buffer verifier 68. The quantized data, which may be compressed, is supplied to a switch 69 and (during normal operation) forwarded to a differential pulse code modulation (DPCM) circuit 65 for pulse code modulation. The modulated data is run-length encoded by a run-length coding circuit 66 and variable-length encoded by a variable-length encoding circuit 67 and forwarded to the subtitle buffer verifier 68 for final processing before being sent to the multiplexer 58.

The subtitle buffer verifier 68 verifies that the buffer is sufficiently filled with data without overflowing. This is done by feeding a control signal (referred to in FIG. 7A as a filter signal) back to the quantization circuit 64. The control signal changes the quantization level of the quantization circuit, thereby changing the amount of data encoded for a particular subtitle. By increasing the quantization level, the amount of data required for the subtitle data is reduced and the bit rate of data flowing to the subtitle buffer verifier is consequently reduced. When the subtitle buffer verifier determines that there is an underflow of data, the control signal decreases the quantization level and the amount of data output from the quantization circuit increases, thereby filling the subtitle buffer verifier.

The subtitle buffer verifier is also responsible for preparing the subtitle data for transmission (over television airwaves, for example). The subtitle buffer verifier inserts information necessary to decode the encoded subtitle data. This information includes a normal/special play signal which indicates whether the subtitles are recorded in a normal or special (fast-forward/reverse) mode. An upper limit value signal is inserted which indicates the upper limit for the memory size of the subtitle data for a frame. An EOP signal marks the end of page for the subtitle data frame and also is inserted. A time code signal is inserted which is used as the time stamp PTS in decoding. Subtitle encoding information is inserted and includes information used in encoding the subtitle data, such as the quantization factor. Positional information is inserted and is used as the position_data upon decoding. A static/dynamic signal is inserted which indicates whether the subtitle data is in static or dynamic mode. The subtitle buffer verifier also inserts the color look up table address for transmission to the decoder so that the colors of the display will match the colors employed in creating the subtitles.

The subtitle buffer verifier is preferably a code buffer similar to the code buffer 22 of the decoder (Fig.2). To that end, it is useful to think of the operation of the subtitle buffer verifier to be in symmetry (i.e., performing the inverse functions of the code buffer) with the code buffer operational diagram of FIG. 11. For example, the color pixels of the subtitles are converted into digital representations; the digital subtitles are encoded by a run length encoder and a variable length encoder; header information is added; and the resultant subtitle information is stored in a buffer and forwarded to a multiplexer for multiplexing with the audio and video data.

The multiplexer 58 multiplexes the encoded subtitle data with the video and audio data, preferably employing a time-sliced multiplexing encoding unit. The multiplexer also provides error correction processing (e.g., error correction coding) and modulation processing (e.g., EFM, eight-to-fourteen modulation). The multiplexed data is then transmitted (via television broadcasting, recording, or other means of transference) to the decoding apparatus for decoding and display.

Colorwiping Encoding

Colorwiping refers to a process by which an image, such as the subtitles, is gradually overlayed with another image. An exemplary application of colorwiping is highlighting, wherein a frame of subtitles is dynamically highlighted from left to right with the passage of time. Highlighting is particularly useful in, for example, Karaoke where the displayed lyrics are highlighted from left to right as the lyrics are sung. The present invention performs colorwiping by changing the color look up table at different points of the subtitle display. For example, an initial subtitle frame is generated with the standard color look up table in FIG. 6. When colorwiping is performed, the color look up table is changed to the color wiping look up table of FIG. 9. With the passage of each frame, the gradual change of the position at which the color look up table is changed from the colorwiping to the standard color look provides the sensation that the subtitles are changing color dynamically over time from left to right.

Figures 8A, 8B:
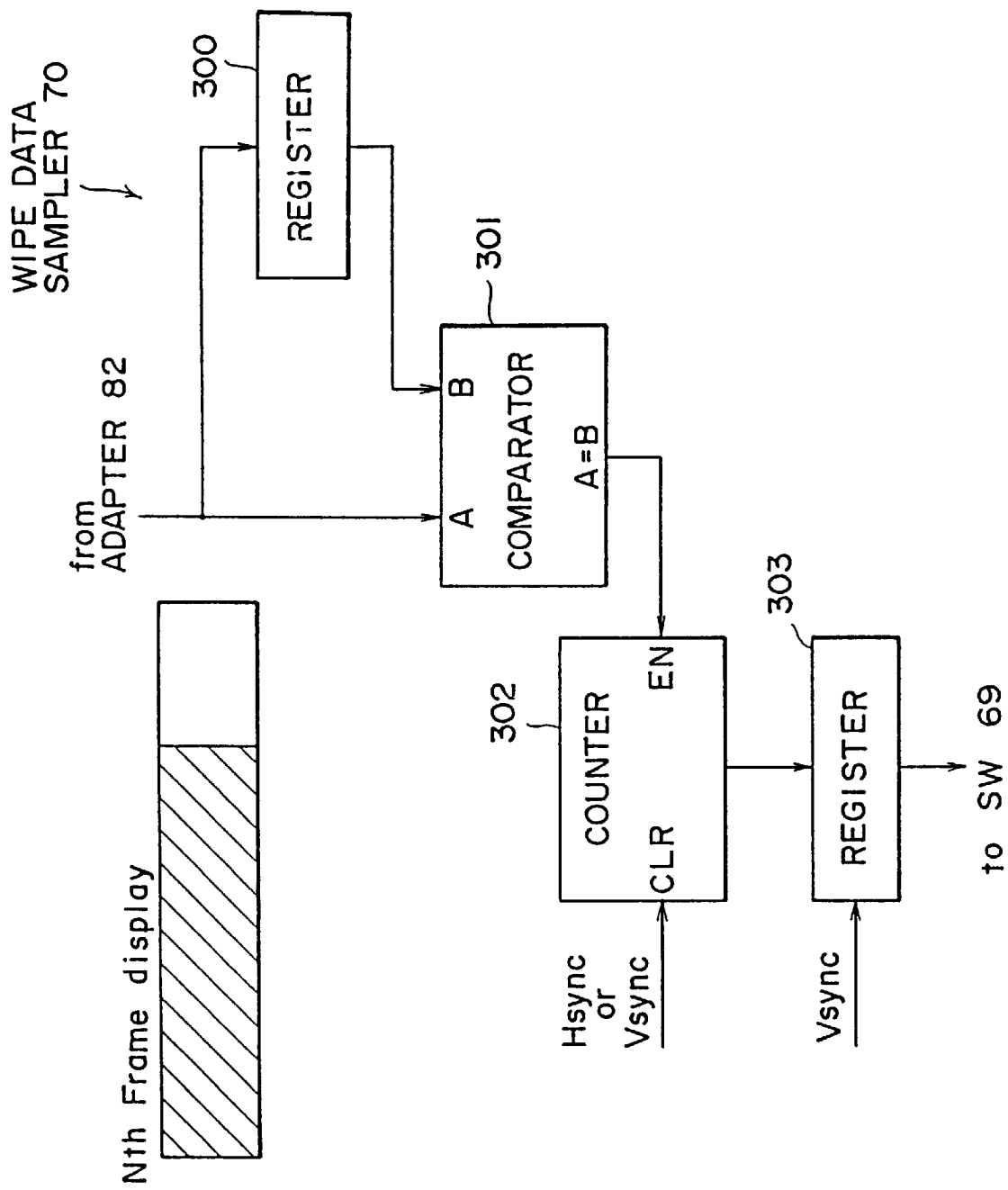

An encoding operation for color wiping will now be discussed with reference to FIGS. 7a, 8a and 8b. During the course of encoding subtitles, an operator may desire to color wipe the previously encoded subtitles. To that end, the operator is provided with a wipe lever 81 to control the colorwiping and a monitor 84 to view the color wiping in real time. The wipe lever is connected to an adapter 82 to adapt the analog voltages of the wipe lever to digital impulses suitable for digital manipulation. The digital output of the adapter is fed to both a switcher 83 and a wipe data sampler 70. The switcher switches the color look up table to values represented by the position of the wipe lever and generates color pixels of the subtitles for display on the monitor. Thus, the operator can visually inspect the colorwiping procedure while it occurs and adjust the speed or color of the wiping to satisfaction.

The wipe data sampler and position sampler 70 determines from the adapter signals where in the video picture the color look up table is to be changed and outputs this information to the encoding circuits 65, 66 and 67 (via switch 69) for encoding and transmission to the multiplexer 58. FIGS. 8a and 8b depict a block diagram of the operation of the wipe data and position sampler. A comparator compares a present pixel signal generated by the adapter with a previous pixel signal from the adapter. This is achieved by transmitting the present pixel value to input A of a comparator 301 while supplying the previous pixel value latched in a register 300 to input B of the comparator 301. The comparator outputs a boolean "true" value to a counter 302 (which is reset at every horizontal or vertical sync pulse) when the present and previous pixels have the same value and the counter increments a count value. That is, the comparator registers a true condition when the pixels up until that point are generated from the same color look up table. At the point where the color look up table changes, therefore, the present and previous pixels become unequal (i.e., their color changes) and the comparator generates a "false" boolean condition. The count value, thus, is equal to the number of matches between the present and previous values, which is the same as the position at which the color look up table changes. The count value is latched by a register 303 upon the following vertical sync pulse and transferred to the encoding circuits (via switch 69) for transmission.

Colorwiping Decoding

Figure 12A:
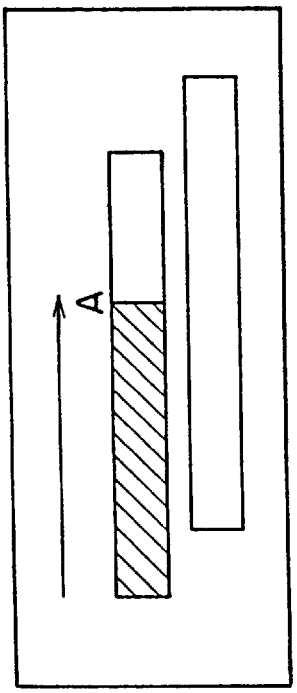
FIGS. 12a to 12c depict a scheme for the colorwiping operation.
Figure 12B:
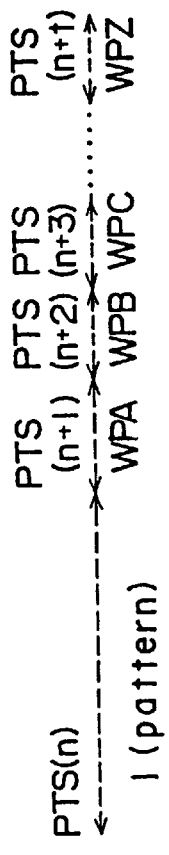
Figure 12C:
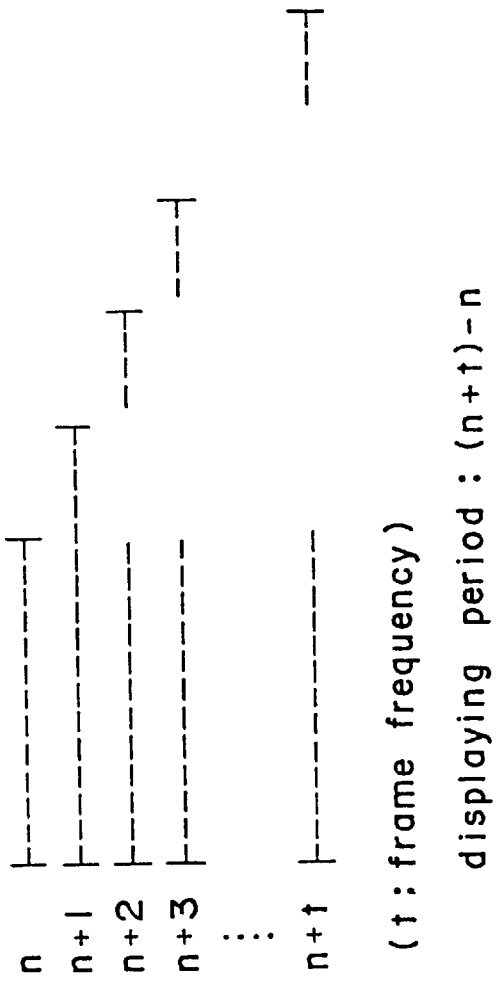

Color wiping decoding will now be discussed with reference to FIGS. 12a–c and 13. FIG. 12a shows the position where the color look up table is switched at point A from a color wiping look up table (FIG. 9) to the standard color look up table (FIG. 6). FIG. 12b depicts a pattern of subtitle and colorwipe data arranged in discrete blocks of presentation time stamps (PTS(n) . . . PTS(n+t)). The first presentation time stamp PTS(n) corresponds to normal subtitle data and the remaining presentation time stamps PTS(n+1 . . . n+t) correspond to colorwiping data (WPA . . . WPZ). FIG. 12c shows successive frames (n . . . n+t) which correspond to the presentation time stamps. To execute colorwiping, each successive colorwiping frame (WPA . . . WPZ) sets the point where the color look up table is switched (point A) further along the displayed subtitle, thereby dynamically performing colorwiping as a function of time.

Figure 13:
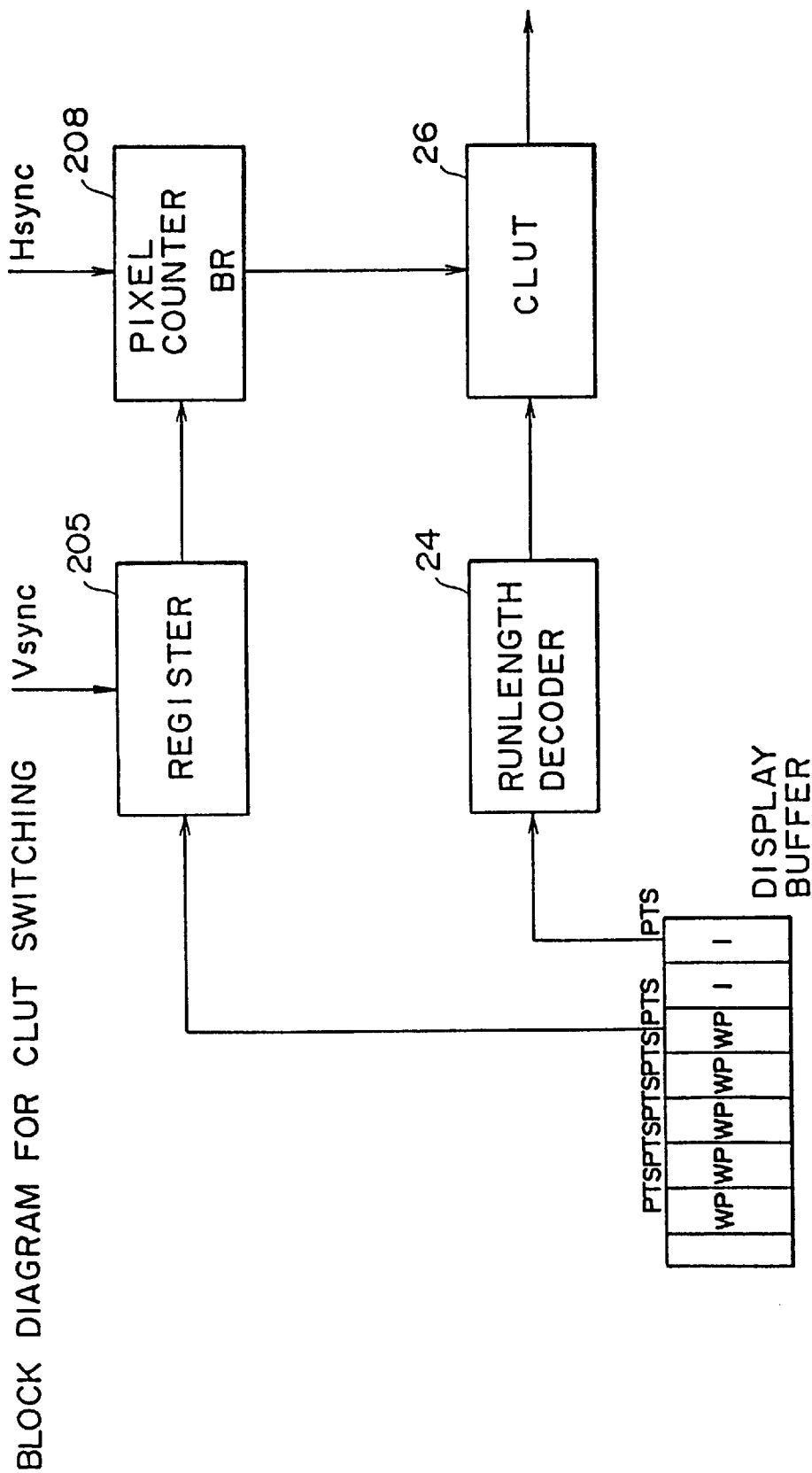
FIG. 13 is a block diagram depicting the colorwiping operation according to FIGS. 12a to 12c.

An operational block diagram of the colorwiping decoding is depicted in FIG. 13. The vertical sync pulse triggers a register 205 to latch the current subtitle frame (FIG. 13 shows a colorwiping frame WP being latched). The colorwiping data latched by the register indicates the position of the color look up table switching. A pixel counter decrements the value indicated by the colorwiping data at each horizontal sync pulse and outputs a boolean "true" flag to the color look up table 26. While the flag is "true" the color look up table employs the colorwiping table (FIG. 9) to decode the colors of the subtitle pixels. When the pixel counter reaches zero, the position of color look table switching is reached and the pixel counter issues a boolean "false" flag to the color look up table 26. At this time, the color look up table switches the colorwiping color look up table (FIG. 9) to the standard look up table (FIG. 6), and the remainder of the subtitle frame is displayed in standard color mode. Each successive colorwiping frame (WPA . . . WPZ) moves the position of switching; thus, each refreshed subtitle frame advances (or retreats) the colorwiping, thus performing dynamic colorwiping.

The colorwiping color look up table in FIG. 9 incorporates two sets of colors (one set for addresses 0h to 7h and a second set for addresses 8h to Fh). Thus, the colorwiping color can be changed to a secondary color simply by changing the most significant bit (MSB) of the color look up table address. For example, the first set of colorwiping colors has a MSB of "0", while the second set has a MSB of "1". Changing the MSB of address 7h to a "1" transforms the address to Fh and the colorwiping color changes. This may be done, for example, by setting the MSB equal to the flag of pixel counter 208.

Employing the MSB to change between color sets has the advantage of reducing the number of bits required to be encoded. Since the MSB is known, only the three lower order bits need to be encoded where 4 bits are employed for every pixel. Where two bits are employed for every pixel, the subtitle data is coded only for the least significant bit. In a 4 bits per 2 pixel format, only the MSB is employed for color control and the remaining three bits can be reserved for pixel information. Thus, by using the MSB the number of bits encoded can be decreased and the overall processing time for encoding and decoding is optimized.

Dynamic Subtitle Positioning

The subtitles are repositioned dynamically, i.e., as a function of time, by employing a similar technique as described above with reference to colorwiping. As shown in FIGS. 14a–c, the position data is measured along the horizontal axis (FIG. 14a) and is transferred to the subtitle decoder with the subtitle data during the appropriate frame (FIG. 14c) corresponding to a presentation time stamp (PTS(n), for example; FIG. 14b).

Figure 15:
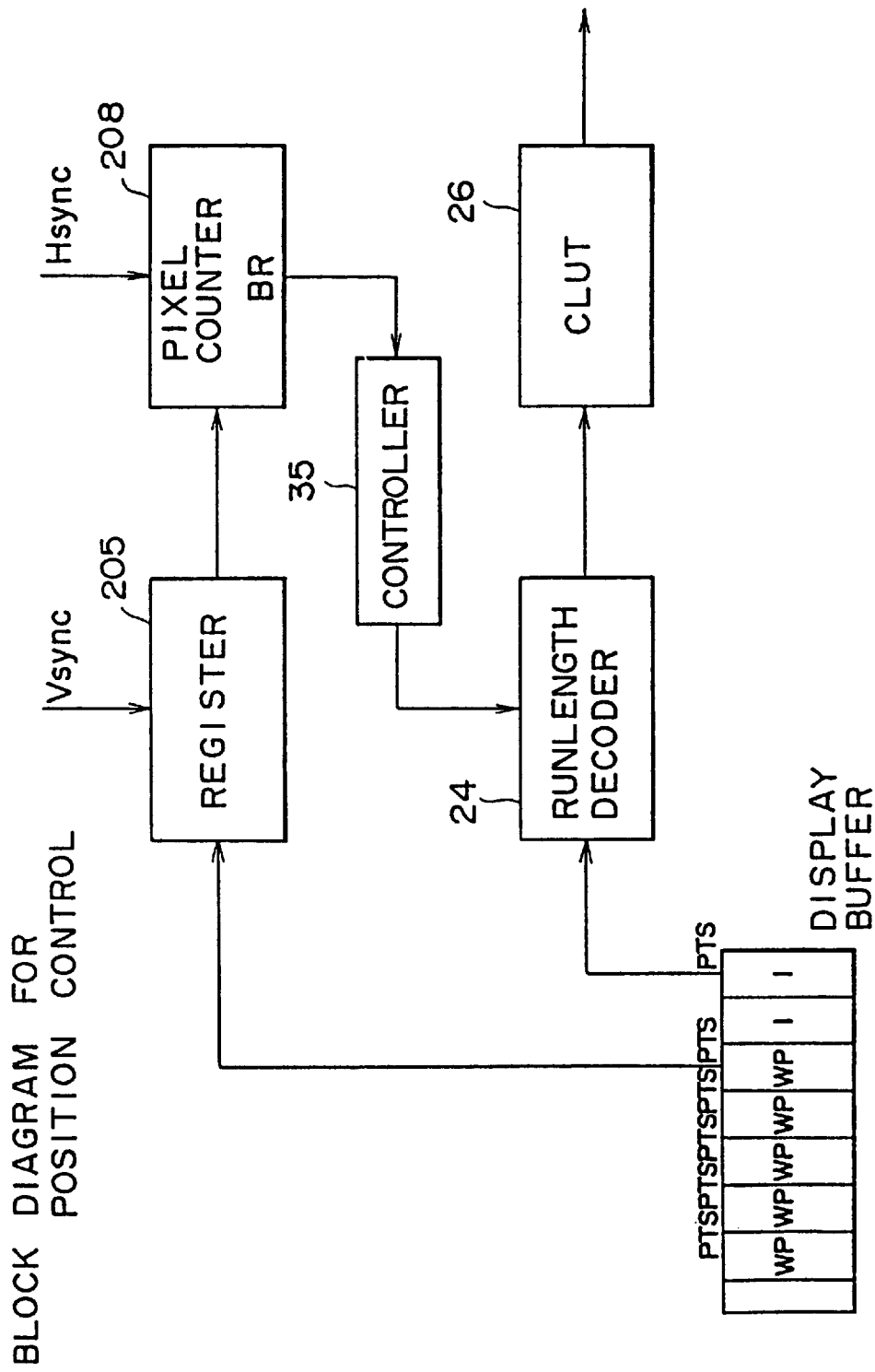
FIG. 15 is a block diagram depicting the dynamic positioning operation according to FIGS. 14a to 14c.
Figure 16A:
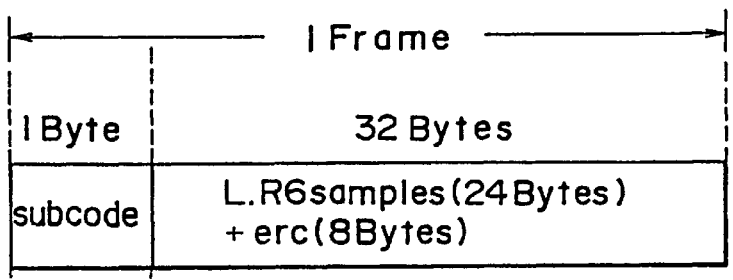
FIGS. 16a to 16c depict the arrangement of data according to a CD-G format.
Figure 16B:
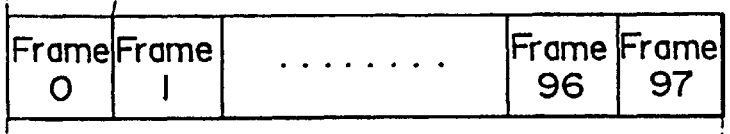
Figure 16C:
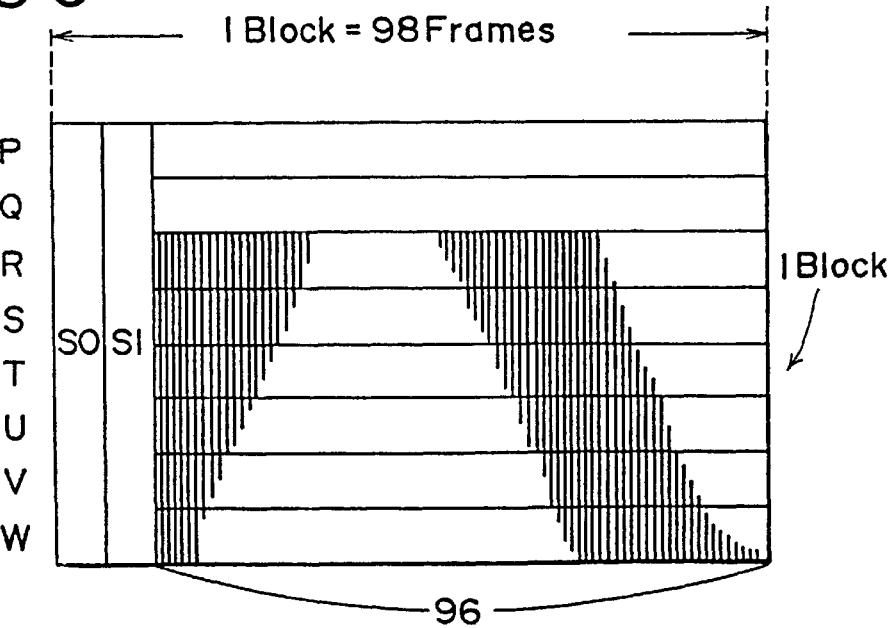
Figure 17:
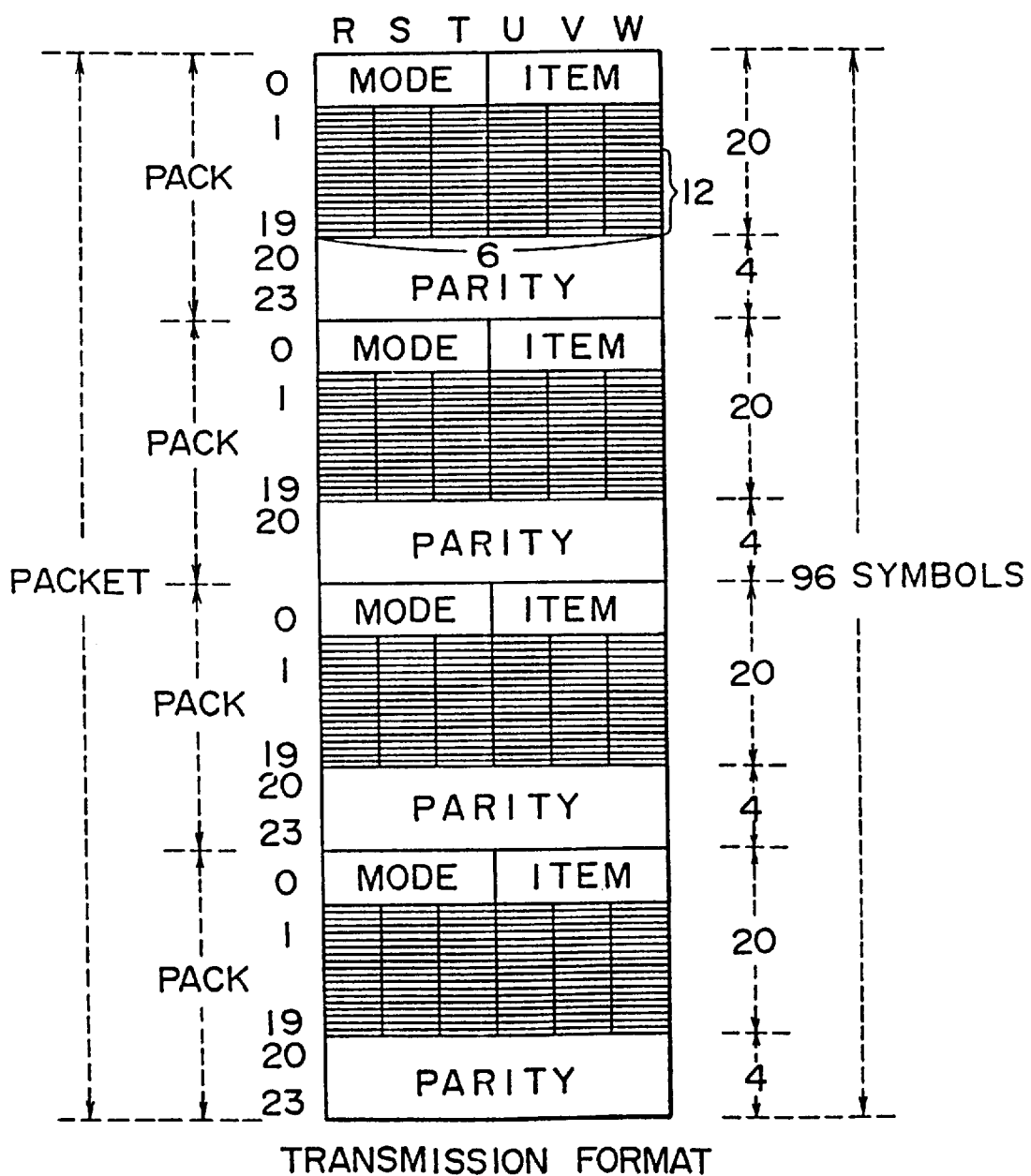
FIG. 17 depicts a transmission format of the data in the CD-G format.

The positioning operation will now be explained with reference to FIG. 15. The position data is a value representing the position of the subtitle frame along the horizontal axis and is read out from the display buffer and latched by register 205 on each vertical sync pulse. Pixel counter 208 decrements the position data on each horizontal sync pulse and send a boolean flag to the controller 35 (FIGS. 2 and 15) to indicate that the position of the subtitle frame has not been reached. When the pixel counter reaches zero, the position of the subtitle frame has been reached and the boolean flag is toggled to indicate this to the controller. The controller, which has been delaying the reading operation of the code buffer 22 (FIG. 2), then causes the code buffer to read out the subtitle data to the run length decoder 24 (FIG. 2). The subtitle data is then decoded as described above and displayed with the corresponding video image. In this manner, the position of the subtitle frame is changed with each frame; thus providing dynamic movement of the subtitle frame.

The present invention, thus, provides subtitle colorwiping and dynamic positioning. Since the subtitles are encoded and decoded in real time separately from the audio/video data, the subtitles can be controlled with great flexibility. In Karaoke, for example, the subtitles may be turned off at any time and instantaneously when it is desired to test the singer's skill in singing the song. Colorwiping and dynamic positioning of the subtitles is also performed in real time, allowing an operator to quickly and easily produce video pictures in mass. Moreover, the results of colorwiping and dynamic positioning may be instantly viewed by an operator and adjusted to satisfaction, providing custom tailoring of each audio/video picture.

It will be appreciated that the present invention is applicable to other applications, such as television or video graphics. It is, therefore, to be understood that, within the scope of the appended claims, the invention may be practiced otherwise than as specifically described herein.

I claim:

1. A subtitle colorwiping encoding apparatus comprising:
    subtitle generating means for generating subtitles for a respective video image;
    color look up table means for generating a color look up table comprised of codes, each code representing color components of a pixel of said subtitles and a mixing ratio determining the degree to which a pixel of said subtitles is mixed with said video image during display such that said subtitles are gradually mixed with said video image during display;
    encoding means for encoding said subtitles into said codes of said color look up table and for separately encoding said video image into encoded video data; and
    colorwiping means for causing at least a portion of said subtitles to have a different color than other portions of said subtitles.

2. The subtitle colorwiping encoding apparatus of claim 1, wherein the colorwiping means comprises wipe data sampler means for indicating a location along said subtitles where said color look up table is to be replaced with a colorwiping color look up table, causing said portion of said subtitles encoded after said location to have a different color than said subtitles encoded before said location.

3. The subtitle colorwiping encoding apparatus of claim 2, wherein the colorwiping means further comprises:
    latch means for latching codes generated by the color look up table means for each pixel in said subtitles;
    comparator means for making a comparison between a present code generated by the color look up table means and a previous code latched by said latch means;
    counter means for keeping a count value of each comparison by said comparator means while said comparison results in a finding of equality between the present and previous codes, indicating that said subtitles are colorwiped until an unequal comparison is made; and
    register means for latching said count value when said comparison yields an unequal result.

4. The subtitle colorwiping encoding apparatus of claim 3, wherein the colorwiping means further comprises:
    a colorwiping selector manually operated and representing a position along said subtitles indicating where colorwiping ends; and
    a monitor for displaying said colorwiping as a function of said colorwiping selector.

5. The subtitle colorwiping encoding apparatus of claim 4, wherein said colorwiping is performed is real time as a video picture composed of several video images is displayed continuously on said monitor.

6. A subtitle colorwiping encoding method comprising the steps of:
    generating subtitles for a respective video image;
    encoding said subtitles into codes of a color look up table, each code representing color components of a pixel of said subtitles and a mixing ratio determining the degree to which a pixel of said subtitles is mixed with said video image during display such that said subtitles are gradually mixed with said video image during display, and separately encoding said video image into encoded video data; and
    colorwiping at least a portion of said subtitles causing said portion to have a different color than other portions of said subtitles.

7. The subtitle colorwiping encoding method of claim 6, wherein the step of colorwiping comprises indicating a location along said subtitles where said color look up table is to be replaced with a colorwiping color look up table, and causing said portion of said subtitles encoded after said location to have a different color than said subtitles encoded before said location.

8. The subtitle colorwiping encoding method of claim 7, wherein the step of colorwiping further comprises the steps of:
    latching codes for each pixel generated by encoding each pixel in said subtitles;
    making a comparison between a present code generated by encoding each pixel and a previously latched code;
    counting a count value of each comparison while said comparison results in a finding of equality between the present and previous codes, indicating that said subtitles are colorwiped until an unequal comparison is made; and
    latching said count value when said comparison yields an unequal result.

9. The subtitle colorwiping encoding method of claim 8, wherein the step of colorwiping further comprises the steps of:
    manually adjusting a colorwiping selector to represent a position along said subtitles indicating where colorwiping ends; and
    displaying on a monitor said colorwiping as a function of said colorwiping selector.

10. The subtitle colorwiping encoding method of claim 8, wherein said step of colorwiping is performed in real time.

11. A subtitle colorwiping decoding apparatus supplied with multiplexed subtitle data encoded into codes of a color look up table and video data, each code representing color components of a pixel of subtitles and a mixing ratio determining a degree to which a pixel of said subtitles is mixed with a video image during display such that said subtitles are gradually mixed with said video image during display, said apparatus comprising:

video decoding means for decoding the video data of said video image to be displayed;

buffer means for storing the subtitle data to be decoded and displayed contemporaneously with said video image;

control means for timing a read out operation of said subtitle data out from said buffer means during a real time display of said video image;

subtitle decoding means for decoding said subtitle data stored in said buffer means from said codes into said color components according to said color look up table; and colorwiping means for changing a color of at least a portion of said subtitles at a predetermined location.

12. The subtitle colorwiping decoding apparatus of claim 11, further comprising mixing means for mixing said video data decoded by said video decoding means with said subtitle data decoded by said subtitle decoding means according to said mixing ratio of said color look up table such that said subtitles are gradually blended into said video image during display.

13. The subtitle colorwiping decoding apparatus of claim 11, wherein said subtitle data includes decoding information indicating said predetermined location where said colorwiping means changes the color of said portion of said subtitles is encoded with said subtitle data, further comprising delay compensation means for compensating a delay caused by subtitle colorwiping decoding such that said subtitles are displayed contemporaneously with said video image and colorwiped at the predetermined location indicated by said decoding information.

14. The subtitle colorwiping decoding apparatus of claim 13, wherein the colorwiping means comprises switching means for switching between the color look up table and a colorwiping color look up table at said predetermined location indicated by said decoding information such that said portion of said subtitles encoded after said predetermined location to have a different color than said portion of the subtitles encoded before said predetermined location.

15. The subtitle colorwiping decoding apparatus of claim 14, wherein the colorwiping means further comprises:

latching means for latching a value indicative of said predetermined location represented by said decoding information; and counting means for decrementing said value as each pixel of said video image is displayed, wherein said switching means switches said color look up table with said colorwiping look up table when said counting means reaches zero.

16. A subtitle colorwiping decoding method for decoding subtitle data encoded into codes of a color look up table multiplexed with video data, each code representing color components of a pixel of said subtitles and a mixing ratio determining a degree to which a pixel of said subtitles is mixed with said video image during display such that said subtitles are gradually mixed with said video image during display, said method comprising the steps of:

video decoding the video data of said video image to be displayed;

storing in a buffer the subtitle data to be decoded and displayed contemporaneously with said video image;

controlling the timing of a read out operation of said subtitle data out from said buffer during a real time display of said video image;

subtitle decoding said subtitle data stored in said buffer from said codes into said color components according to said color look up table; and colorwiping said subtitles by changing a color of at least a portion of said subtitles at a predetermined location.

17. The subtitle colorwiping decoding method of claim 16, wherein said subtitle data includes decoding information indicating said predetermined location where said colorwiping means changes the color of said portion of said subtitles with said subtitle data, further comprising delay compensating a delay inherent in colorwiping decoding such that said subtitles are displayed contemporaneously with said video image and colorwiped at the predetermined location indicated by said decoding information.

18. The subtitle colorwiping decoding method of claim 17, wherein the step of colorwiping further comprises switching between the color look up table and a colorwiping color look up table at said predetermined location indicated by said decoding information such that said portion of said subtitles encoded after said location to have a different color than said portion of the subtitles encoded before said location.

19. The subtitle colorwiping decoding method of claim 18, wherein the step of colorwiping further comprises:

latching a value indicative of said predetermined location represented by said decoding information; and decrementing said value as each pixel of said video image is displayed, wherein said color look up table is switched with said colorwiping look up table when said value is decremented to zero.

20. The subtitle colorwiping decoding method of claim 19, further comprising the step of mixing according to said mixing ratio of said color look up table such that said subtitles are gradually blended with said video image, said video data decoded by said step of video decoding with said encoded subtitle data decoded by said step of subtitle decoding.

21. A subtitle position decoding apparatus supplied with multiplexed subtitle data and video data, said encoded subtitle data encoded into codes of a color look up table, each code representing color components of a pixel of said subtitles and a mixing ratio determining a degree to which a pixel of said subtitles is mixed with said video image during display such that said subtitles are gradually mixed with said video image during display, comprising:

video decoding means for decoding the video data of said video image to be displayed;

buffer means for storing the subtitle data to be decoded and displayed contemporaneously with said video image;

subtitle decoding means for decoding said subtitle data stored by said buffer means from said codes into said color components according to said color look up table;

control means for timing a read out operation of said subtitle data from said buffer means to said subtitle decoding means during a real time display of said video image; and means for dynamically changing a position in the video image where said subtitles are superimposed during display.

22. The subtitle position decoding apparatus of claim 21, further comprising mixing means for mixing said video data decoded by said video decoding means with said encoded data decoded by said subtitle decoding means according to said mixing ratio of said color look up table such that said subtitles are gradually blended with said video image during display.

23. The subtitle position decoding apparatus of claim 21, wherein said means for dynamically changing comprise:

latching means for latching a value indicative of said position where said subtitles are to be superimposed; and counting means for decrementing said value each time a pixel of said video image is displayed, wherein said control means performs said read out operation when said counting means reaches zero such that said subtitles to be superimposed with said video image at that time.

24. The subtitle position decoding apparatus of claim 23, wherein said subtitle data includes decoding information indicating said position where said means for dynamically charging changes said position where said subtitles are superimposed, further comprising:

delay compensation means for compensating a delay caused by components of the subtitle position decoding apparatus so as to display said subtitles with said video image at a position indicated by said decoding information included in said subtitle data.

25. A subtitle position decoding method for decoding subtitle data multiplexed with video data, said subtitle data encoded into codes of a color look up table, each code representing color components of a pixel of said subtitles and a mixing ratio determining a degree to which a pixel of said subtitles is mixed with said video image during display such that said subtitles are gradually mixed with said video image during display, said method comprising the steps of:

video decoding the encoded video data of said video image to be displayed;

storing the encoded subtitle data in a buffer to be displayed contemporaneously with said video image;

subtitle decoding said subtitle data stored in said buffer from said codes into said color components according to said color look up table;

timing a read out operation of said subtitle data from said buffer for reading out said encoded subtitle data for decoding by said step of subtitle decoding during a real time display of said video image; and dynamically changing a position in the video image where said subtitles are superimposed during display.

26. The subtitle position decoding method of claim 25, further comprising mixing decoded video data with decoded subtitle data according to said mixing ratio such that said subtitles are gradually blended with said video image during display.

27. The subtitle position decoding method of claim 25, wherein the position of said subtitles is dynamically changed by the steps of:

latching a value indicative of said position where said subtitles are to be superimposed; and decrementing said value each time a pixel of said video image is displayed, wherein said read out operation is performed when said value is decremented to zero, causing said subtitles to be superimposed with said video image at that time.

28. The subtitle position decoding method of claim 27, further comprising the step of delay compensating an inherent delay caused by subtitle position decoding.

* * * * *